(12) United States Patent
Maeda

(10) Patent No.: US 12,202,089 B2
(45) Date of Patent: Jan. 21, 2025

(54) METAL MEMBER, PROCESSING SYSTEM, AND METHOD FOR MANUFACTURING METAL MEMBER

(71) Applicant: Sumitomo Electric Sintered Alloy, Ltd., Takahashi (JP)

(72) Inventor: Kazuo Maeda, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 337 days.

(21) Appl. No.: 17/642,953

(22) PCT Filed: Sep. 4, 2020

(86) PCT No.: PCT/JP2020/033659
§ 371 (c)(1),
(2) Date: Mar. 15, 2022

(87) PCT Pub. No.: WO2021/054153
PCT Pub. Date: Mar. 25, 2021

(65) Prior Publication Data
US 2022/0331924 A1    Oct. 20, 2022

(30) Foreign Application Priority Data
Sep. 17, 2019  (JP) .................. 2019-168902

(51) Int. Cl.
*B23C 3/02*    (2006.01)
*B23C 3/12*    (2006.01)
(Continued)

(52) U.S. Cl.
CPC .............. *B23Q 15/08* (2013.01); *B23C 3/02* (2013.01); *B23C 3/12* (2013.01); *B23Q 17/0961* (2013.01);
(Continued)

(58) Field of Classification Search
CPC ..... B23B 51/102; B23C 2220/52; B23C 3/02; B23C 3/12; B23C 2220/16;
(Continued)

(56) References Cited

U.S. PATENT DOCUMENTS 2,974,548 A * 3/1961 Miller ................. B23B 39/24
                                                408/46
3,814,535 A * 6/1974 Steiner ................ B23B 51/102
                                                408/187
(Continued)

FOREIGN PATENT DOCUMENTS

DE    3326820 A1 * 2/1985
DE    4228322 A1 * 3/1994
(Continued)

OTHER PUBLICATIONS

Written Opinion of the International Searching Authority for PCT/JP2020/033659 (Year: 2020).*

*Primary Examiner* — Erica E Cadugan
(74) *Attorney, Agent, or Firm* — XSENSUS LLP

(57) ABSTRACT

A processing system includes a drilling tool and a chamfering tool that process a workpiece. The workpiece includes a first plate that includes: a first hole penetrating a first front surface and a first back surface; an opening edge constituting the first hole, a front-side first opening edge being provided in the first front surface; a back-side first opening edge constituting the first hole, the back-side first opening edge being provided in the first back surface; and a first chamfered portion provided on at least one of the front-side first opening edge and the back-side first opening edge, and the workpiece includes a second plate that includes: a second hole including a back-side second opening edge provided in at least a second back surface; and a back-side second chamfered portion provided at the back-side second opening edge, an axis of the first hole and an axis of the second hole
(Continued)

are coaxial, and the at least one of the first chamfered portion and the back-side second chamfered portion have a cutting mark.

15 Claims, 13 Drawing Sheets

(51) Int. Cl.
  *B23Q 15/06* (2006.01)
  *B23Q 15/08* (2006.01)
  *B23Q 17/09* (2006.01)
  *B23Q 17/10* (2006.01)
  *B23Q 17/20* (2006.01)
  *B23Q 17/22* (2006.01)
  *B23B 5/10* (2006.01)

(52) U.S. Cl.
  CPC ............ *B23Q 17/10* (2013.01); *B23Q 17/20* (2013.01); *B23C 2220/16* (2013.01); *B23C 2220/52* (2013.01); *Y10T 29/5107* (2015.01); *Y10T 409/304144* (2015.01); *Y10T 409/307616* (2015.01)

(58) Field of Classification Search
  CPC .......... Y10T 409/307616; Y10T 409/304144; Y10T 29/5105–5108
  USPC .................... 409/200, 138; 29/26 R–26 B
  See application file for complete search history.

(56) References Cited

U.S. PATENT DOCUMENTS

| | | | | |
|---|---|---|---|---|
| 5,035,551 A | * | 7/1991 | Neumann | B23B 51/102 408/230 |
| 5,173,013 A | * | 12/1992 | Gorse | B23B 51/102 408/22 |
| 5,181,810 A | | 1/1993 | Heule | |
| 5,186,584 A | * | 2/1993 | Muller | B23B 51/102 408/26 |
| 11,989,006 B2 | * | 5/2024 | Maeda | B23Q 17/09 |
| 2004/0068394 A1 | * | 4/2004 | Maekawa et al. | |
| 2017/0232527 A1 | * | 8/2017 | Henry | B23C 1/08 408/1 R |
| 2021/0001416 A1 | * | 1/2021 | Chan | B23C 3/02 |

FOREIGN PATENT DOCUMENTS

| | | | | |
|---|---|---|---|---|
| DE | 10119645 A1 | * | 5/2002 | |
| EP | 3031557 A1 | | 6/2016 | |
| GB | 2490955 A | * | 11/2012 | ......... B23B 51/0027 |
| GB | 2498099 A | * | 7/2013 | ............ B23B 35/00 |
| JP | 57-205005 A | * | 12/1982 | |
| JP | 59-024908 A | * | 2/1984 | |
| JP | 2-172612 A | | 7/1990 | |
| JP | 9-85585 A | | 3/1997 | |
| JP | 11-320223 A | | 11/1999 | |
| JP | 2002-113607 A | * | 4/2002 | |
| JP | 2004-130407 A | | 4/2004 | |
| JP | 2006-336078 A | | 12/2006 | |
| JP | 2008-012617 A | * | 1/2008 | |
| JP | 2010-247265 A | * | 11/2010 | |
| JP | 2011-023643 A | | 2/2011 | |
| JP | 2016-112634 A | | 6/2016 | |
| JP | 2018-199179 A | * | 12/2018 | |
| WO | WO-99/21674 A1 | * | 5/1999 | |
| WO | WO-2018/000009 A1 | * | 1/2018 | |

* cited by examiner

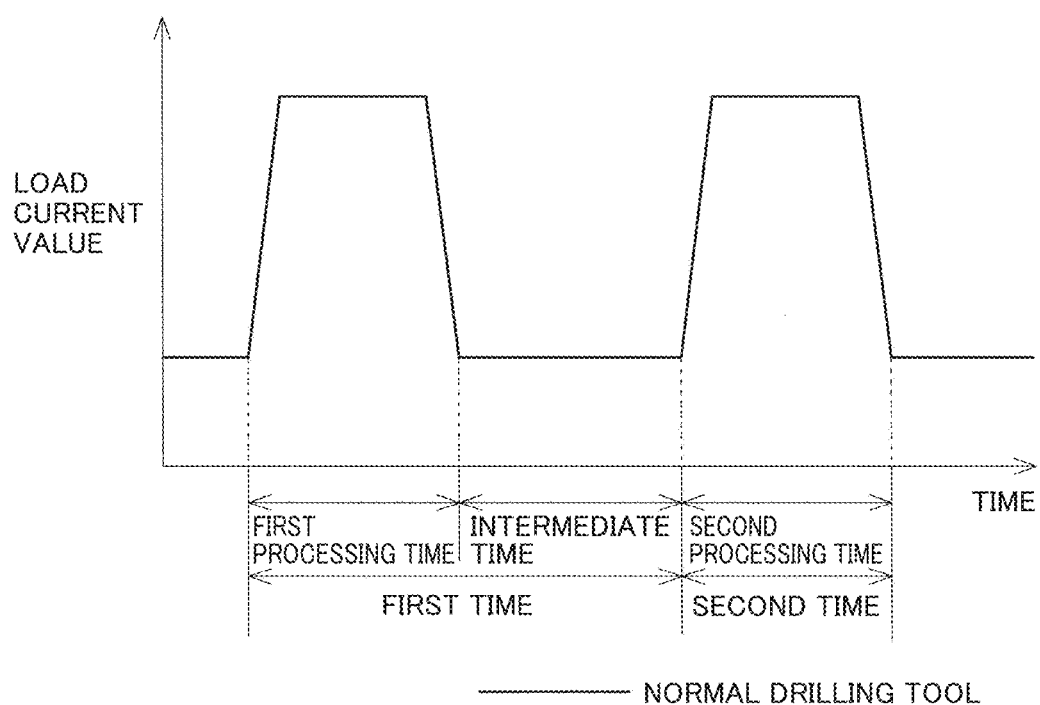

METAL MEMBER, PROCESSING SYSTEM, AND METHOD FOR MANUFACTURING METAL MEMBER

CROSS-REFERENCE TO RELATED APPLICATIONS

The present application is based on PCT filing PCT/JP2020/033659, filed Sep. 4, 2020, which claims priority to Japanese Patent Application No. 2019-168902, filed on Sep. 17, 2019, the entire contents of each are incorporated herein by reference.

TECHNICAL FIELD

The present disclosure relates to a metal member, a processing system, and a method for manufacturing the metal member.

BACKGROUND ART

Patent Document 1 discloses that a sintered component is subjected to drilling with a drill.

CITATION LIST

Patent Literature

PTL 1: Japanese Patent Laying-Open No. 2006-336078

SUMMARY OF INVENTION

According to one aspect of the present disclosure, a metal member includes: a first plate that includes a first front surface and a first back surface; a second plate that includes a second front surface and a second back surface; and a leg that fixes the first plate and the second plate such that the first back surface and the second back surface face each other at an interval.
The first plate includes:
a first hole penetrating the first front surface and the first back surface;
a front-side first opening edge constituting the first hole, the front-side first opening edge being provided in the first front surface;
a back-side first opening edge constituting the first hole, the back-side first opening edge being provided in the first back surface; and
a first chamfered portion provided on at least one of the front-side first opening edge and the back-side first opening edge,
the second plate includes:
a second hole including a back-side second opening edge provided in at least the second back surface; and
a back-side second chamfered portion provided at the back-side second opening edge, an axis of the first hole and an axis of the second hole are coaxial, and the at least one of the first chamfered portion and the back-side second chamfered portion have a cutting mark.
According to another aspect of the present disclosure, a processing system includes:
a drilling tool and a chamfering tool that process a workpiece made of a metal member;
a first drive mechanism that operates the drilling tool;
a second drive mechanism that operates the chamfering tool;
a controller that controls the first drive mechanism and the second drive mechanism; and
a measurement unit that acquires a first physical quantity and a second physical quantity related to the control of the first drive mechanism.
The workpiece includes:
a first plate including a first front surface and a first back surface;
a second plate including a second front surface and a second back surface; and
a leg that fixes the first plate and the second plate such that the first back surface and the second back surface face each other at an interval,
the first drive mechanism operates the drilling tool so as to coaxially and sequentially process a first hole penetrating the first front surface and the first back surface and a second hole provided in the second plate,
the first hole is a hole including a front-side first opening edge provided in the first front surface and a back-side first opening edge provided in the first back surface,
the second hole is a hole including a back-side second opening edge provided in at least the second back surface,
the second drive mechanism operates the chamfering tool so as to provide a first chamfered portion at a first opening edge of at least one of the front-side first opening edge and the back-side first opening edge, and to provide a back-side second chamfered portion at the back-side second opening edge, and
the controller
obtains a position of the at least one first opening edge and a position of the back-side second opening edge based on the first physical quantity and the second physical quantity, and
controls the second drive mechanism based on the position of the at least one first opening edge and the position of the back-side second opening edge.
According to still another aspect of the present disclosure, a method for manufacturing a metal member, the method includes:
preparing a workpiece made of a metal member;
drilling the workpiece using a drilling tool operated by a first drive mechanism;
chamfering the workpiece by cutting using a chamfering tool operated by a second drive mechanism;
acquiring a first physical quantity and a second physical quantity related to control of the first drive mechanism by a measurement unit; and
obtaining a position of a first opening edge of at least one of a front-side first opening edge and a back-side first opening edge and a position of a back-side second opening edge based on the first physical quantity and the second physical quantity.
The workpiece includes:
a first plate including a first front surface and a first back surface;
a second plate including a second front surface and a second back surface;
a leg that fixes the first plate and the second plate such that the first back surface and the second back surface face each other at an interval,
the drilling includes processing coaxially and sequentially a first hole penetrating the first front surface and the first back surface and a second hole provided in the second plate, the first hole is a hole including the front-side first opening edge provided on the first front surface and the back-side first opening edge provided on the first back surface, the second hole is a hole including a back-side second opening edge provided on at least the second back surface, and the chamfering includes providing a first chamfered portion in the at least one first opening edge and providing a back-side second chamfered portion in the back-side second opening edge based on the position of the at least one first opening edge and the position of the back-side second opening edge.

BRIEF DESCRIPTION OF DRAWINGS

FIG. 68 is an explanatory view illustrating chamfering performed on a first hole in the processing system and the method for manufacturing the metal member of the first embodiment.

FIG. 7 is a graph illustrating a transition of a load current of a rotation power source that rotates a drilling tool acquired by a measurement unit included in the processing system of the first embodiment.

DETAILED DESCRIPTION

Figure 1:
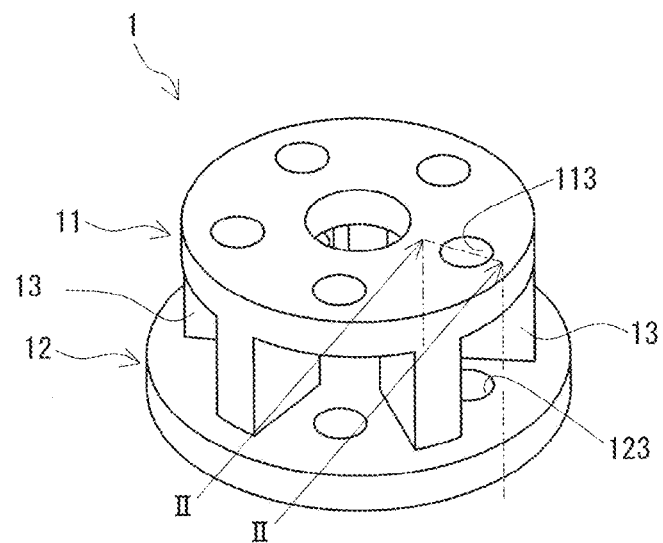
FIG. 1 is a perspective view illustrating a metal member according to a first embodiment.

Problem to be Solved by the Present Disclosure

When an insertion object is inserted into a hole made in a workpiece by drilling, sometimes a chamfered portion is provided at an opening edge of the hole. This is because the chamfered portion can be used for guiding the insertion object. For example, a cutting tool or a shaft can be cited as the insertion object. Processing accuracy of the chamfered portion is desired to be high. When the processing accuracy of the chamfered portion is low, it is difficult to appropriately guide the insertion object. For this reason, the insertion object is inclined with respect to the hole and hardly inserted straight. From the viewpoint of enhancing the processing accuracy of the chamfered portion, desirably the chamfered portion is processed by not grinding but cutting.

However, sometimes it is difficult to cut the opening edge depending on the shape of the workpiece. One of the reasons is that there is no sufficient space where the chamfering tool used for cutting can be disposed. In addition, as another reason, even when there is a space where the chamfering tool can be disposed, the position of the opening edge varies due to dimensional tolerance of the workpiece. The position of the chamfering tool with respect to the opening edge deviates when the position of the opening edge varies. For this reason, appropriate chamfering cannot be performed on the opening edge, and the processing accuracy of the chamfered portion degrades.

An object of the present disclosure is to provide a metal member including a chamfered portion cut in at least respective opening edges facing each other in a first hole and a second hole coaxially provided at an interval.

Another object of the present disclosure is to provide a processing system and a method for manufacturing a metal member capable of manufacturing the metal member including the chamfered portion cut in at least the respective opening edges facing each other in the first hole and the second hole that are provided at an interval and includes a common axis.

Advantageous Effect of the Present Disclosure

The portion where the first plate and the second plate face each other in the metal member of the present disclosure can be said to be a portion that is difficult to process due to a large restriction on tool routing. Even when the metal member has a shape having a portion that is difficult to process, the metal member of the present disclosure can be a member having coaxial accuracy between the axis of the first hole and the axis of the second hole, positional accuracy between the first hole and the first chamfered portion, and positional accuracy between the second hole and the second chamfered portion.

The processing system of the present disclosure and the method for manufacturing the metal member of the present disclosure can manufacture the metal member including the chamfered portion cut at least at the respective opening edges on the sides facing each other in the first hole and the second hole that are spaced from each other and have the common axis.

DESCRIPTION OF EMBODIMENTS OF THE PRESENT DISCLOSURE

The present inventors have conducted studies obtaining the metal member having both coaxial accuracy between the axis of the first hole and the axis of the second hole, positional accuracy between the first hole and the first chamfered portion, and positional accuracy between the second hole and the second chamfered portion.

A material in which the first plate, the second plate, and the leg are integrated is assumed as a material for processing the metal member. The integral material includes a material in which the first plate, the second plate, and the leg are joined. In this case, both the holes can be processed with high coaxial accuracy by continuously processing the first hole and the second hole in the first plate and the second plate using one drilling tool. However, it is difficult to perform chamfering processing by cutting on the portion of the plates facing each other. For example, even when a tool is introduced from between the plates and the legs to perform the chamfering on the opening edge where the first hole and the second hole facing each other, it is practically impossible to perform appropriate processing. This is because, in order to perform processing such that the tool does not interfere with the leg, restriction on the routing of the tool is too large. On the other hand, it is conceivable that the tool is introduced between the first plate and the second plate through the first hole, and that the first chamfered portion and the second chamfered portion are processed at opening edges of the first hole and the second hole facing each other. In this case, there is a risk that the positional accuracy of each chamfered portion in the axial direction of each hole is insufficient. This is because there is tolerance in a thickness of each plate and the interval between both plates.

Subsequently, a material in which the first plate, the second plate, and the leg portion are separated is assumed as a material for processing the metal member in this case, each hole and each chamfered portion having high positional accuracy can be processed. This is because there are few restrictions on the routing of the tool, and each hole and each chamfered portion can be individually processed for each plate. On the other hand, when the first plate, the second plate, and the leg portion are combined, it is difficult to sufficiently ensure the coaxial accuracy of both the holes. This is because it is difficult to join a plurality of members to each other with high positional accuracy.

Based on the above studies, the present inventors have completed the present invention. Embodiments of the present disclosure will be described below. In the following description, the first front surface and the first back surface of the first plate and the first front surface and the second back surface of the second plate have the following meanings. The first front surface and the second front surface are surfaces of the first plate and the second plate that are located away from each other. The first back surface and the second back surface are surfaces located on the sides close to each other of the first plate and the second plate, and are surfaces facing each other with a space at an interval.

(1) According to one aspect of the present disclosure, a metal member includes.

a first plate that includes a first front surface and a first back surface; a second plate that includes a second front surface and a second back surface; and a leg that fixes the first plate and the second plate such that the first back surface and the second back surface face each other at an interval.

The first plate includes:
a first hole penetrating the first front surface and the first back surface;
a front-side first opening edge constituting the first hole, the front-side first opening edge being provided in the first front surface;
a back-side first opening edge constituting the first hole, the back-side first opening edge being provided in the first back surface; and
a first chamfered portion provided on at least one of the front-side first opening edge and the back-side first opening edge, the second plate includes:
a second hole including a back-side second opening edge provided in at least the second back surface; and
a back-side second chamfered portion provided at the back-side second opening edge, an axis of the first hole and an axis of the second hole are coaxial, and the at least one of the first chamfered portion and the back-side second chamfered portion have a cutting mark.

Even when the metal member has a shape having a portion that is difficult to process, the metal member can be a member having coaxial accuracy between the axis of the first hole and the axis of the second hole, positional accuracy between the first hole and the first chamfered portion, and positional accuracy between the second hole and the second chamfered portion.

Because the front-side first chamfered portion and the back-side second chamfered portion have a cutting mark, the insertion object can be appropriately guided to the first hole and the second hole when being inserted into the first hole and the second hole in this order from the first front surface side of the first plate. The cutting mark is provided by cutting. In general, processing accuracy of the chamfered portion formed by cutting is higher than processing accuracy of the chamfered portion formed by grinding. Accordingly, in the chamfered portion with high processing accuracy, the insertion object can be easily inserted straight without being inclined with respect to the first hole and the second hole.

The back-side first chamfered portion can prevent degradation of appearance of the metal member. When the first hole is formed by the drilling from the first front surface toward the first back surface of the first plate, sometimes a burr or a chip is formed on the back-side first opening edge that is an outlet of the drilling tool. The burr and the chip degrades the appearance of the metal member. However, because the metal member of the first embodiment is provided with the back-side first chamfered portion in the back-side first opening edge, the burr or the chip is removed, so that the appearance is good. The burr or the chip is removed, so that quality of a product of the metal member is high. In addition, because the burr may be an obstacle to the insertion object, the insertion object is easily inserted into the first hole by removing the burr, and the insertion object can be prevented from being deviated in the first hole by the burr. The back-side second chamfered portion includes the cutting mark, which prevents the degradation of the appearance of the metal member.

(2) As one aspect of the metal member,
the second hole is a through-hole penetrating the second front surface and the second back surface,
the first plate includes:
a front-side first chamfered portion provided at the front-side first opening edge; and
a back-side first chamfered portion provided at the back-side first opening edge, the second plate includes:
a front-side second opening edge provided on the second front surface; and
a front-side second chamfered portion provided at the front-side second opening edge, and the front-side first chamfered portion, the back-side first chamfered portion, and the back-side second chamfered portion have the cutting mark.

Even when the insertion object is inserted through the second hole and the first hole in this order from the second front surface side of the second plate, the metal member is easily inserted straight without being inclined with respect to the first hole and the second hole. In addition, in the metal member, although the second hole is a through-hole, the appearance is good because the front-side second chamfered portion is provided at the front-side second opening edge.

(3) According to one aspect of the present disclosure, a processing system includes:
a drilling tool and a chamfering tool that process a workpiece made of a metal member;
a first drive mechanism that operates the drilling tool;
a second drive mechanism that operates the chamfering tool;
a controller that controls the first drive mechanism and the second drive mechanism; and
a measurement unit that acquires a first physical quantity and a second physical quantity related to the control of the first drive mechanism.
The workpiece includes:
a first plate including a first front surface and a first back surface;
a second plate including a second front surface and a second back surface; and
a leg that fixes the first plate and the second plate such that the first back surface and the second back surface face each other at an interval,
the first drive mechanism operates the drilling tool so as to coaxially and sequentially process a first hole penetrating the first front surface and the first back surface and a second hole provided in the second plate,
the first hole is a hole including a front-side first opening edge provided in the first front surface and a back-side first opening edge provided in the first back surface,
the second hole is a hole including a back-side second opening edge provided in at least the second back surface,
the second drive mechanism operates the chamfering tool so as to provide a first chamfered portion at a first opening edge of at least one of the front-side first opening edge and the back-side first opening edge, and to provide a back-side second chamfered portion at the back-side second opening edge, and
the controller
obtains a position of the at least one first opening edge and a position of the back-side second opening edge based on the first physical quantity and the second physical quantity, and
controls the second drive mechanism based on the position of the at least one first opening edge and the position of the back-side second opening edge.

Even when the processing system has a shape having a portion that is difficult to process, the metal member having coaxial accuracy between the axis of the first hole and the axis of the second hole, positional accuracy between the first hole and the first chamfered portion, and positional accuracy between the second hole and the second chamfered portion can be manufactured. The reason is as follows.

In the processing system, the first hole and the second hole are coaxially drilled in the first plate and the second plate that are fixed by the leg. Accordingly, the processing system can improve the coaxial accuracy between the axis of the first hole and the axis of the second hole.

In the processing system, even when the position of the opening edge varies due to dimensional tolerance of the workpiece, the at least one of the position of the first opening edge and the position of the second opening edge can be accurately obtained by the controller. The processing system can control the second drive mechanism for each workpiece based on the at least one of the position of the first opening edge and the position of the second opening edge that are obtained by the controller such that the chamfering tool can appropriately chamfer the at least one of the first opening edge and the second opening edge. Accordingly, in the processing system, the positional accuracy between the first hole and the first chamfered portion and the positional accuracy between the second hole and the second chamfered portion can be improved.

(4) As one aspect of the processing system,
the first physical quantity is a feed speed of the drilling tool,
the second physical quantity is a first time from a start of drilling of the first plate to a start of drilling of the second plate,
the at least one of the position of the first opening edge and the position of the back-side second opening edge are obtained by a length along an axial direction of the first hole and a length between the first plate and the second plate, and
the length of the first hole along the axial direction and the length between the first plate and the second plate are obtained based on the feed speed and the first time The processing system can accurately grasp the position of the at least one of the position of the first opening edge and the position of the back-side second opening edge.

(5) As one aspect of the processing system,
the chamfering tool has a columnar body having an outer diameter smaller than an outer diameter of the drilling tool,
a distal end of the body includes a tapered cutting edge toward a distal end side, and
a rear end of the body has a tapered cutting edge toward a rear end side.

In the processing system, the back-side first opening edge can be chamfered by the cutting edge at the rear end. In the processing system, the front-side first opening edge and the back-side second opening edge can be chamfered with the cutting edge of the distal end. That is, the processing system can continuously perform the chamfering on the first opening edge of at least one of the front-side first opening edge and the back-side first opening edge and the back-side second opening edge with one chamfering tool, so that the productivity of the metal member is excellent.

(6) As one aspect of the processing system,
the first drive mechanism includes a rotation power source rotating the drilling tool,
the measurement unit acquires an electric quantity of the rotation power source,
the controller changes a revolving speed of the rotation power source based on a difference between a first electric quantity and a second electric quantity,
the first electric quantity is an electric quantity acquired by the measurement unit during rotation of the rotation power source and before processing of the workpiece, and the second electric quantity is an electric quantity acquired by the measurement unit during drilling of the workpiece.

The state during rotation of the rotation power source and before processing of the workpiece refers to a state in which the drilling tool and the workpiece do not come into contact with each other while the drilling tool is rotated by the rotation power source under the same cutting conditions as those for actually processing the workpiece. It does not matter whether the workpiece is held by a table of the processing system. Hereinafter, during rotation of the rotation power source and before processing of the workpiece may be simply referred to as during idling of the rotation power source.

The processing system can prevent production of a defective product not subjected to predetermined drilling by the drilling tool. The reason is that, according to the processing system, as will be described later, a loss of the drilling tool can be detected by comparing a threshold with the difference, and the rotation speed of the rotation power source can be changed by the controller when the drilling tool defects. The chipping includes breakage of the drilling tool in addition to the generation of chipping in the blade of the drilling tool.

The reason why the defect of the drilling tool can be detected by comparing the threshold with the difference is as follows. When the defect is generated in the drilling tool, a region of the drilling tool that is not in contact with the workpiece increases. When the region of the drilling tool that becomes non-contact is excessively large, the drilling itself becomes difficult. This state in which the drilling is difficult can be regarded as a state in which the workpiece and the drilling tool are substantially idling relative to each other. That is, the first electric quantity approaches the second electric quantity, and the difference decreases. The second electric quantity is about the same as the first electric quantity, and sometimes the difference is substantially eliminated. As a result, the difference changes from more than the threshold to less than or equal to the threshold. Accordingly, whether the difference satisfies the threshold or less can be grasped by obtaining the difference, and whether the defect is generated in the drilling tool can be grasped. The threshold will be described later.

(7) As one aspect of the processing system of (6),
the first electric quantity and the second electric quantity are at least one of magnitude, a differential value, and an integral value of a load current of the rotation power source.

The processing system can easily detect the defect of the drilling tool. This is because at least one of the magnitude, the differential value, and the integral value of the load current of the rotation power source is correlated with the defect of the drilling tool.

When the defect is generated in the drilling tool, the drilling itself becomes difficult, and thus processing resistance at the time of processing the workpiece becomes small. When the processing resistance is small, load torque of the rotation power source decreases, so that the load current of the rotation power source decreases. That is, when the defect is generated in the drilling tool, the load current of the rotation power source decreases during processing of the workpiece.

Specifically, when the drilling tool does not contact the workpiece while the defect is generated in the drilling tool, a processing depth is zero (0). Because the processing depth is zero, the magnitude, the differential value, and the integral value of the load current of the rotation power source during processing of the workpiece are substantially the same as the magnitude, the differential value, and the integral value of the load current during idling of the rotation power source. On the other hand, when the drilling tool comes into contact with the workpiece although the drilling tool has the defect, the processing depth decreases. Because the processing depth is small, the magnitude, the differential value, and the integral value of the load current of the rotation power source during processing of the workpiece are small although not as large as when the drilling tool does not come into contact with the workpiece. That is, the magnitude, the differential value, and the integral value of the load current of the rotation power source during processing of the workpiece approach the magnitude, the differential value, and the integral value of the load current during idling of the rotation power source. Consequently, at least one of the magnitude, the differential value, and the integral value of the load current of the rotation power source can be used to grasp whether the drilling tool processes the workpiece, namely, whether the defect is generated in the drilling tool.

(8) As one aspect of the processing system of (6) or (7),
the controller sets the revolving speed of the rotation power source to zero when the difference is less than or equal to a threshold The processing system can prevent the defective product from being continuously produced. The reason is that when the difference is equal to or less than the threshold, namely, when the defect is generated in the drilling tool, the revolving speed of the rotation power source can be set to zero by the controller. When the revolving speed of the rotation power source becomes zero, the rotation of the drilling tool or the workpiece stops.

(9) According to one aspect of the present disclosure, a method for manufacturing a metal member, the method includes:
preparing a workpiece made of a metal member;
drilling the workpiece using a drilling tool operated by a first drive mechanism;
chamfering the workpiece by cutting using a chamfering tool operated by a second drive mechanism;
acquiring a first physical quantity and a second physical quantity related to control of the first drive mechanism by a measurement unit; and
obtaining a position of a first opening edge of at least one of a front-side first opening edge and a back-side first opening edge and a position of a back-side second opening edge based on the first physical quantity and the second physical quantity.

The workpiece includes:
a first plate including a first front surface and a first back surface;
a second plate including a second front surface and a second back surface;
a leg that fixes the first plate and the second plate such that the first back surface and the second back surface face each other at an interval,
the drilling includes processing coaxially and sequentially a first hole penetrating the first front surface and the first back surface and a second hole provided in the second plate,
the first hole is a hole including the front-side first opening edge provided on the first front surface and the back-side first opening edge provided on the first back surface,
the second hole is a hole including a back-side second opening edge provided on at least the second back surface, and the chamfering includes providing a first chamfered portion in the at least one first opening edge and providing a back-side second chamfered portion in the back-side second opening edge based on the position of the at least one first opening edge and the position of the back-side second opening edge.

Similarly to the processing system, even when the method for manufacturing the metal member has a shape having a portion that is difficult to process, the metal member having coaxial accuracy between the axis of the first hole and the axis of the second hole, positional accuracy between the first hole and the first chamfered portion, and positional accuracy between the second hole and the second chamfered portion can be manufactured.

(10) As one aspect of the method for manufacturing the metal member, in providing the chamfered portion, the second drive mechanism is operated such that a chamfered length of the chamfered portion is smaller than a dimensional tolerance of a length between the first plate and the second plate.

The method for manufacturing the metal member is suitable when the chamfered length is made smaller than the dimensional tolerance. Usually, when the chamfered length is less than the dimensional tolerance, sometimes the chamfering tool cannot be properly brought into contact with the opening edge and the opening edge cannot be properly chamfered. However, in the method for manufacturing the metal member, as described above, the position of each opening edge can be accurately obtained, and the chamfering tool can be operated corresponding to the position of each opening edge. Accordingly, in the method for manufacturing the metal member, even when the chamfered length is smaller than the dimensional tolerance, the chamfering tool is appropriately brought into contact with the opening edge, and the appropriate chamfering can be performed.

Detailed Description of Embodiments

Details of embodiments of the present disclosure will be described below.

First Embodiment

[Metal Member]

With reference to FIGS. 1 to 4, a metal member 1 according to a first embodiment will be described. Metal member 1 includes a first plate 11, a second plate 12, and a leg 13. First plate 11 has a first front surface 111 and a first back surface 112. Second plate 12 has a second front surface 121 and a second back surface 122. Leg 13 fixes first plate 11 and second plate 12 such that first back surface 112 and second back surface 122 face each other at an interval First plate 11 includes a first hole 113 that penetrates first front surface 111 and first back surface 112, a front-side first opening edge 114 that is an opening edge constituting first hole 113 and is provided on first front surface 111, and a back-side first opening edge 115 provided on first back surface 112. Second plate 12 includes a second hole 123 including a back-side second opening edge 125 provided on at least on second back surface 122.

One of the features of metal member 1 of the first embodiment is that metal member 1 has the following requirements (1) to (4).

Figure 2:
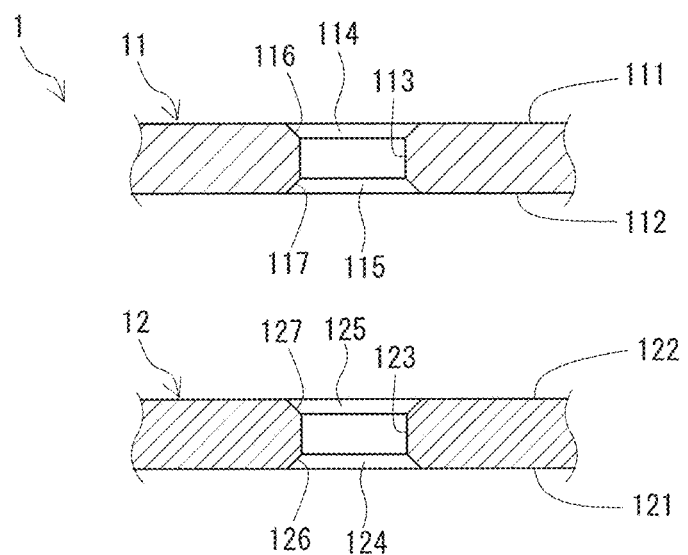
FIG. 2 is a sectional view schematically illustrating the metal member taken along a line (II)-(II) in FIG. 1.
Figure 3:
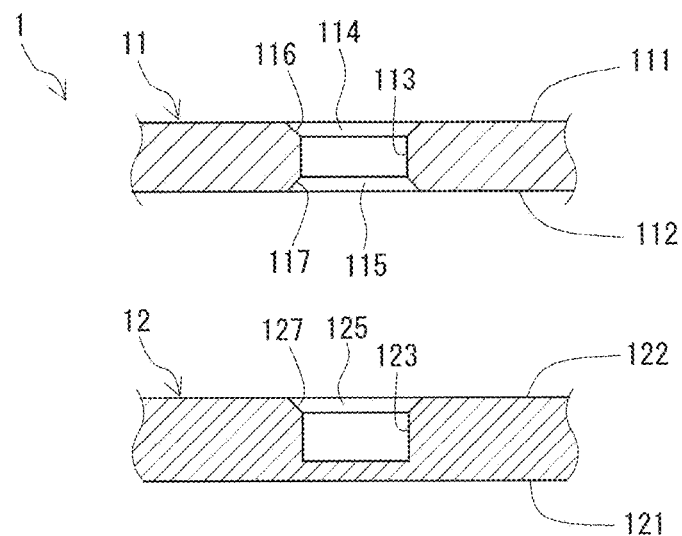
FIG. 3 is a sectional view schematically illustrating another metal member taken along a line (II)-(II) in FIG. 1.

(1) As illustrated in FIG. 2 or 3, the axes of first hole 113 and second hole 123 are coaxial.

(2) First plate 11 has a first chamfered portion provided on at least one of front-side first opening edge 114 and back-side first opening edge 115.

(3) Second plate 12 has a back-side second chamfered portion 127 provided at back-side second opening edge 125.

Figure 4:
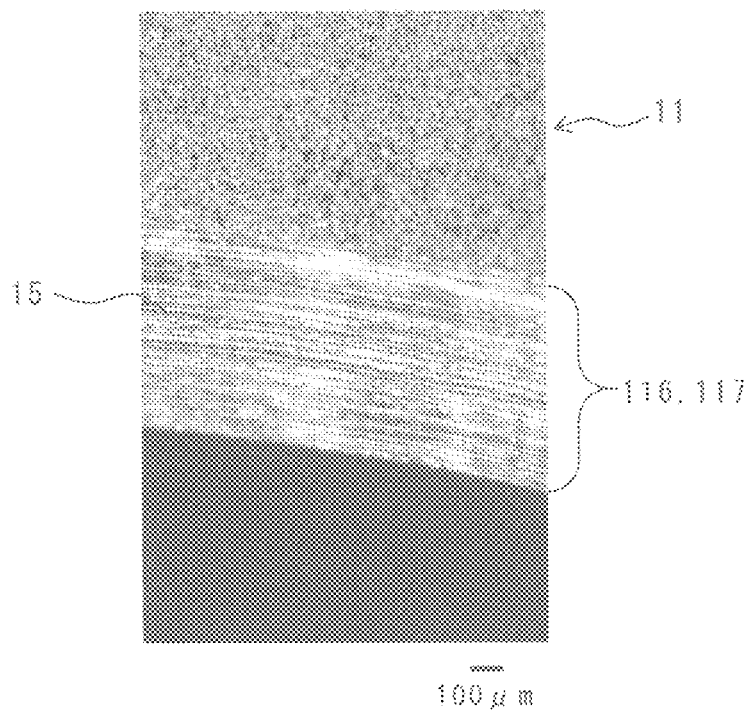
FIG. 4 is a view illustrating a photograph of a chamfered portion in the metal member of the first embodiment.

(4) At least one of first chamfered portions and back-side second chamfered portion 127 include a cutting mark 15 as illustrated in FIG. 4.

Details of each constitution will be described below.

[First Plate]

A material and a type of first plate 11 are not particularly limited, but can be appropriately selected. For example, pure iron, an iron alloy, and a nonferrous metal can be cited as an example of the material of first plate 11. A green compact, a sintered body, and an ingot material can be cited as an example of the type of first plate 11. The green compact is obtained by pressure-molding a raw material powder. The sintered body is obtained by sintering the green compact. The ingot material is obtained by solidifying a molten raw material. In the first embodiment, first plate 11 is made of the sintered body made of the iron alloy. An outer shape of first plate 11 is not particularly limited as long as it is a flat shape, but can be appropriately selected. The outer shape of first plate 11 is a circular shape in the first embodiment. First front surface 111 and first back surface 112 of first plate 11 are not limited to a flat surface, but may be provided with irregularities.

(First Hole)

As illustrated in FIG. 2 or 3, first hole 113 is a through-hole penetrating in a thickness direction of first plate 11. The thickness is a length between first front surface 111 and first back surface 112. That is, the thickness direction of first plate 11 is a direction along a direction in which first front surface 111 and first back surface 112 face each other. In FIGS. 2 and 3, the thickness direction of first plate 11 is a vertical direction of a page. First hole 113 includes front-side first opening edge 114 and back-side first opening edge 115. Front-side first opening edge 114 is provided on first front surface 111 of first plate 11. Back-side first opening edge 115 is provided on first back surface 112 of first plate 11.

An inner circumferential shape of first hole 113 is cylindrical in the first embodiment. That is, contour shapes of front-side first opening edge 114 and back-side first opening edge 115 are circular. Preferably the inner circumferential surface of first hole 113 includes a cutting mark. The cutting mark is formed in a plurality of stripe shapes along the circumferential direction of first hole 113. The number of first holes 113 is not particularly limited, but can be appropriately selected. The number of first holes 113 may be singular or plural. In the first embodiment, the number of first holes 113 is five as illustrated in FIG. 1. Five first holes 113 are arranged in parallel on the circumference centered on the center of first plate 11. The center of first plate 11 refers to the center of a circumscribed circle of first plate 11. In the first embodiment, five first holes 113 are made at substantially equal intervals on the circumference.

(First Chamfered Portion)

First plate 11 includes a first chamfered portion provided on at least one of front-side first opening edge 114 and back-side first opening edge 115. In the first embodiment, the first chamfered portion is provided on both front-side first opening edge 114 and back-side first opening edge 115. Hereinafter, the first chamfered portion provided in front-side first opening edge 114 is referred to as a front-side first chamfered portion 116, and the first chamfered portion provided in back-side first opening edge 115 is referred to as a back-side first chamfered portion 117.

Front-side first chamfered portion 116 functions as a guide for an insertion object inserted into first hole 113. The illustration of the insertion object is omitted. Cutting tools such as reamers and accessory parts such as shafts can be cited as an example of the insertion object. In general, processing accuracy of the chamfered portion formed by cutting is higher than processing accuracy of the chamfered portion formed by grinding. The chamfered portion with high processing accuracy easily appropriately guide the insertion object. That is, because front-side first chamfered portion 116 is formed by cutting, the insertion object is easily inserted straight without being inclined with respect to first hole 113. For example, in the case where the insertion object is a reamer, when the reamer is linearly inserted into first hole 113, the inner circumferential surface of first hole 113 can be accurately finished by the reamer. Consequently, the processing accuracy of the inner circumferential surface of first hole 113 is improved. In the case where the processing accuracy of the inner circumferential surface of first hole 113 is high, when the shaft is inserted into first hole 113, the shaft is easily inserted straight without being inclined with respect to first hole 113.

Back-side first chamfered portion 117 can prevent degradation in appearance of metal member 1. When first hole 113 is formed by the drilling from first front surface 111 toward first back surface 112 of first plate 11, sometimes a burr or a chip is formed on back-side first opening edge 115 that is an outlet of the drilling tool. The burr or the chip degrades appearance of metal member 1. However, because metal member 1 of the first embodiment is provided with back-side first chamfered portion 117 in back-side first opening edge 115, the burr or the chip is removed, so that the appearance is good. The burr or the chip is removed, so that quality of a product of metal member 1 is high. In addition, because the burr may be an obstacle to the insertion object, the insertion object is easily inserted into first hole 113 by removing the burr, and the insertion object can be prevented from being deviated in first hole 113 by the burr. When second hole 123 described later is a through-hole while the insertion object is inserted in order of second hole 123 and first hole 113 from the side of second front surface 121 of second plate 12, back-side first chamfered portion 117 easily appropriately guides the insertion object.

Front-side first chamfered portion 116 and back-side first chamfered portion 117 are formed over the entire circumference of each first opening edge. Front-side first chamfered portion 116 and back-side first chamfered portion 117 include cutting mark 15 as illustrated in FIG. 4. Cutting mark 15 is formed in the plurality of stripe shapes along the circumferential direction of each first chamfered portion. Cutting mark 15 is formed by cutting. Examples of the form of front-side first chamfered portion 116 and back-side first chamfered portion 117 include chamfering or R-chamfering. In this embodiment, front-side first chamfered portion 116 and back-side first chamfered portion 117 are the chamfering.

[Second Plate]

Examples of the material and type of second plate 12 include the same material and type as those of first plate 11 described above. The material and type of second plate 12 are preferably the same as the material and type of first plate 11. In the first embodiment, similarly to first plate 11, second plate 12 is made of a sintered body made of an iron alloy. The outer shape of second plate 12 is not particularly limited as long as it is a flat shape, but can be appropriately selected. The outer shape of second plate 12 of the first embodiment is a circular shape. Similarly to first plate 11, second front surface 121 and second back surface 122 of second plate 12 are not limited to a flat surface, but may be provided with irregularities.

(Second Hole)

As illustrated in FIG. 2 or 3, the axis of second hole 123 is coaxial with the axis of first hole 113. That is, second hole 123 is formed at a position facing first hole 113 in second plate 12. The number of second holes 123 is the same as the number of first holes 113, and is five in the first embodiment as illustrated in FIG. 1. In the first embodiment, five second holes 123 are provided at substantially equal intervals on a circumference centered on the center of second plate 12.

Examples of the type of the second hole 123 include a through-hole in FIG. 2 and a blind hole in FIG. 3. The through-hole penetrates second plate 12 in the thickness direction. The thickness is a length between second front surface 121 and second back surface 122. That is, the thickness direction of second plate 12 is a direction along a direction in which second front surface 121 and second back surface 122 face each other. In FIGS. 2 and 3, the thickness direction of the second plate 12 is the vertical direction of the page. The through-hole has a front-side second opening edge 124 provided in second front surface 121 of second plate 12 and a back-side second opening edge 125 provided on second back surface 122. On the other hand, the blind hole is a hole having a bottom, and does not include front-side second opening edge 124 but includes back-side second opening edge 125. The type of second hole 123 in the first embodiment is a through-hole in FIG. 2.

In the first embodiment, the inner circumferential shape of second hole 123 is the same cylindrical shape as the inner circumferential shape of first hole 113. That is, the contour shapes of front-side second opening edge 124 and back-side second opening edge 125 are circular. The inner diameter of second hole 123 is the same as the inner diameter of first hole 113. The inner circumferential surface of second hole 123 preferably includes the cutting mark. The cutting mark are formed in the plurality of stripe shapes along the circumferential direction of second hole 123.

(Second Chamfered Portion)

Second plate 12 includes a back-side second chamfered portion 127 provided on at least back-side second opening edge 125. In the first embodiment, second plate 12 further includes a front-side second chamfered portion 126 provided on the front-side second opening edge 124. Front-side second chamfered portion 126 and back-side second chamfered portion 127 are formed over the entire circumference of each second opening edge. Each of the second chamfered portions includes the cutting mark similar to the cutting mark 15 described above with reference to FIG. 4. The cutting mark of the second chamfered portion is formed in the plurality of stripe shapes along the circumferential direction of each second chamfered portion. The cutting mark of the second chamfered portion is formed by cutting. The second chamfered portion is the chamfering. Because back-side second chamfered portion 127 is formed by cutting, the insertion object passing through first hole 113 is easily inserted straight without being inclined with respect to second hole 123. Because front-side second chamfered portion 126 is formed by cutting, the appearance is good. In addition, when the insertion object is inserted into second hole 123 from the side of second front surface 121 of second plate 12, the insertion object is easily inserted straight without being inclined with respect to second hole 123.

(Coaxial Accuracy)

For example, an amount of deviation between the axis of first hole 113 and the axis of second hole 123 is less than or equal to Φ0.1 mm. It is assumed that the axis of first hole 113 and the axis of second hole 123 are coaxial when the amount of deviation between the axes is less than or equal to Φ0.1 mm. The amount of deviation between the axes is further preferably less than or equal to Φ0.05 mm, is particularly less than or equal to Φ0.03 mm, and is most preferably zero (0).

The deviation amount between the axes is obtained as follows. A virtual plane orthogonal to the axis of first hole 113 is taken. A first intersection point with the axis of first hole 113 and a second intersection point with the axis of second hole 123 are taken on the virtual plane. The axis of first hole 113 is set to the center of the inscribed circle of first hole 113. The axis of second hole 123 is set to the center of the inscribed circle of second hole 123. The shortest length between the first intersection and the second intersection is obtained. The shortest length is defined as a deviation amount between the axes.

(Position Accuracy)

The deviation amount in a chamfered width between front-side first chamfered portion 116 and back-side first chamfered portion 117 is preferably less than or equal to 0.05 mm on one side, and the deviation amount in chamfered length is preferably less than or equal to 0.05 mm on one side. The deviation amount in the chamfered width is further preferably less than or equal to 0.025 mm one side, and is particularly preferably less than or equal to 0.015 mm on one side. The deviation amount in the chamfered length is further preferably less than or equal to 0.025 mm one side, and is particularly preferably less than or equal to 0.015 mm one side.

The deviation amount in the chamfered width between front-side second chamfered portion 126 and back-side second chamfered portion 127 is preferably less than or equal to 0.05 mm on one side, and the deviation amount in chamfered length is preferably less than or equal to 0.05 mm on one side. The deviation amount in the chamfered width is further preferably less than or equal to 0.025 mm one side, and is particularly preferably less than or equal to 0.015 mm on one side. The deviation amount in the chamfered length is further preferably less than or equal to 0.025 mm one side, and is particularly preferably less than or equal to 0.015 mm one side.

The deviation amount in the chamfered width between front-side first chamfered portion 116 and front-side second chamfered portion 126 is preferably less than or equal to 0.1 mm on one side, and the deviation amount in chamfered length is preferably less than or equal to 0.1 mm one side. The deviation amount in the chamfered width is further preferably less than or equal to 0.05 mm on one side, and is particularly preferably less than or equal to 0.03 mm on one side. The deviation amount in the chamfered length is further preferably less than or equal to 0.05 mm on one side, and is particularly preferably less than or equal to 0.03 mm on one side.

The deviation amount in the chamfered width between back-side first chamfered portion 117 and back-side second chamfered portion 127 is preferably less than or equal to 0.1 mm on one side, and the deviation amount in chamfered length is preferably less than or equal to 0.1 mm on one side. The deviation amount in the chamfered width is further preferably less than or equal to 0.05 mm on one side, and is particularly preferably less than or equal to 0.03 mm on one side. The deviation amount in the chamfered length is further preferably less than or equal to 0.05 mm on one side, and is particularly preferably less than or equal to 0.03 mm on one side.

The deviation amount in the chamfered width between front-side first chamfered portion 116 and back-side second chamfered portion 127 is preferably less than or equal to 0.1 mm on one side, and the deviation amount in chamfered length is preferably less than or equal to 0.1 mm on one side. The deviation amount in the chamfered width is further preferably less than or equal to 0.05 mm on one side, and is particularly preferably less than or equal to 0.03 mm on one side. The deviation amount in the chamfered length is further preferably less than or equal to 0.05 mm on one side, and is particularly preferably less than or equal to 0.03 mm on one side.

The deviation amount in chamfered width between back-side first chamfered portion 117 and front-side second chamfered portion 126 is preferably less than or equal to 0.1 mm on one side, and the deviation amount in chamfered length is preferably less than or equal to 0.1 mm on one side. The deviation amount in the chamfered width is further preferably less than or equal to 0.05 mm on one side, and is particularly preferably less than or equal to 0.03 mm on one side. The deviation amount in the chamfered length is further preferably less than or equal to 0.05 mm on one side, and is particularly preferably less than or equal to 0.03 mm on one side.

When the chamfered portion is the chamfering, in a right triangle having the chamfered portion as an oblique side, a length of a side along a direction orthogonal to the axial direction of first hole 113 or second hole 123 in two sides excluding the oblique side is defined as the chamfered width, and a length of a side along the axial direction of first hole 113 or second hole 123 is defined as the chamfered length. When the chamfered portion is the R-chamfering, in the right triangle in which a line segment connecting the inflection points of the curved surface of the chamfered portion and the surfaces connected to the curved surface by a straight line is set to the oblique side, the length of the side along the direction orthogonal to the axial direction of first hole 113 and second hole 123 in two sides excluding the oblique side is defined as the chamfered width, and the length of the side along the axial direction of first hole 113 or second hole 123 is defined as the chamfered length.

[Leg]

As illustrated in FIG. 1, leg 13 fixes first plate 11 and second plate 12. In the first embodiment, leg 13 connects first back surface 112 and second back surface 122. The same material and type of first plate 11 and second plate 12 described above can be cited as the material and type of leg 13. The same material and type of first plate 11 and second plate 12 are preferable for the material and type of leg 13. This is because it is easy to increase connecting strength between first plate 11 and second plate 12. Legs 13 of the first embodiment are formed in series on first back surface 112 of first plate 11. A distal end of leg 13 is connected to second back surface 122 of second plate 12. An appropriate technique such as brazing can be used as the connection. The number of legs 13 is not particularly limited, but can be appropriately selected. The number of legs 13 may be singular or plural. The number of legs 13 is five in the first embodiment. Five legs 13 are arranged in parallel on the circumference centered on the center of first plate 11. In the first embodiment, five legs 13 are provided at substantially equal intervals on the circumference. Each leg 13 is disposed between first holes 113 adjacent to each other in the circumferential direction. The shape of each leg 13 is not particularly limited, but can be appropriately selected. The shape of each leg 13 is a trapezoidal columnar shape in the first embodiment.

[Application]

Metal member 1 of the first embodiment can be suitably used for various general structural components. Examples of the general structural component include a mechanical component such as a planetary carrier.

[Operation and Effect]

Metal member 1 of the first embodiment can be a member having a shape having a portion that is difficult to process, and having the coaxial accuracy of the axis of first hole 113 and the axis of second hole 123, the positional accuracy of front-side first chamfered portion 116 and back-side first chamfered portion 117 and first hole 113, and the positional accuracy of front-side second chamfered portion 126 and back-side second chamfered portion 127 and second hole 123. Accordingly, in metal member 1 of the first embodiment, the insertion object is easily inserted straight without being inclined with respect to first hole 113 and second hole 123. In addition, metal member 1 of the first embodiment has the good appearance. Consequently, the product of metal member 1 of the first embodiment is high quality.

[Processing System]

With reference to FIGS. 5A to 5C, 6A to 6E, and 7, a processing system 10 of the first embodiment will be described. Processing system 10 of the first embodiment includes a drilling tool 21 in FIG. 5A and the like, a chamfering tool 22 in FIG. 6A and the like, a first drive mechanism 31 and a second drive mechanism 32, a measurement unit 40, and a controller 50. Drilling tool 21 and chamfering tool 22 process a workpiece 100. First drive mechanism 31 operates drilling tool 21. Second drive mechanism 32 operates chamfering tool 22. Controller 50 controls first drive mechanism 31 and second drive mechanism 32.

One of the features of processing system 10 according to the first embodiment is that processing system 10 includes the following (1) to (6).

(1) Drilling tool 21 makes a specific hole in specific workpiece 100.

(2) Chamfering tool 22 forms the chamfered portion at the opening edge of the hole.

(3) First drive mechanism 31 causes drilling tool 21 to perform a predetermined operation (4) Second drive mechanism 32 causes chamfering tool 22 to perform a predetermined operation.

(5) Measurement unit 40 acquires a first physical quantity and a second physical quantity related to the control of first drive mechanism 31. Details of the first physical quantity and the second physical quantity will be described later.

(6) Controller 50 obtains the position of the opening edge of the hole, and controls second drive mechanism 32 based on the position of the opening edge of the hole.

Processing system 10 of the first embodiment can manufacture metal member 1 described above with reference to FIGS. 1 to 4. The following description will be given in the order of an outline of workpiece 100 and details of each constitution of processing system 10. A second arithmetic unit 52 and a second storage unit 56 illustrated in FIGS. 5A to 5C and 6A to 6E will be described in a second embodiment described later.

[Workpiece]

Figure 5A:
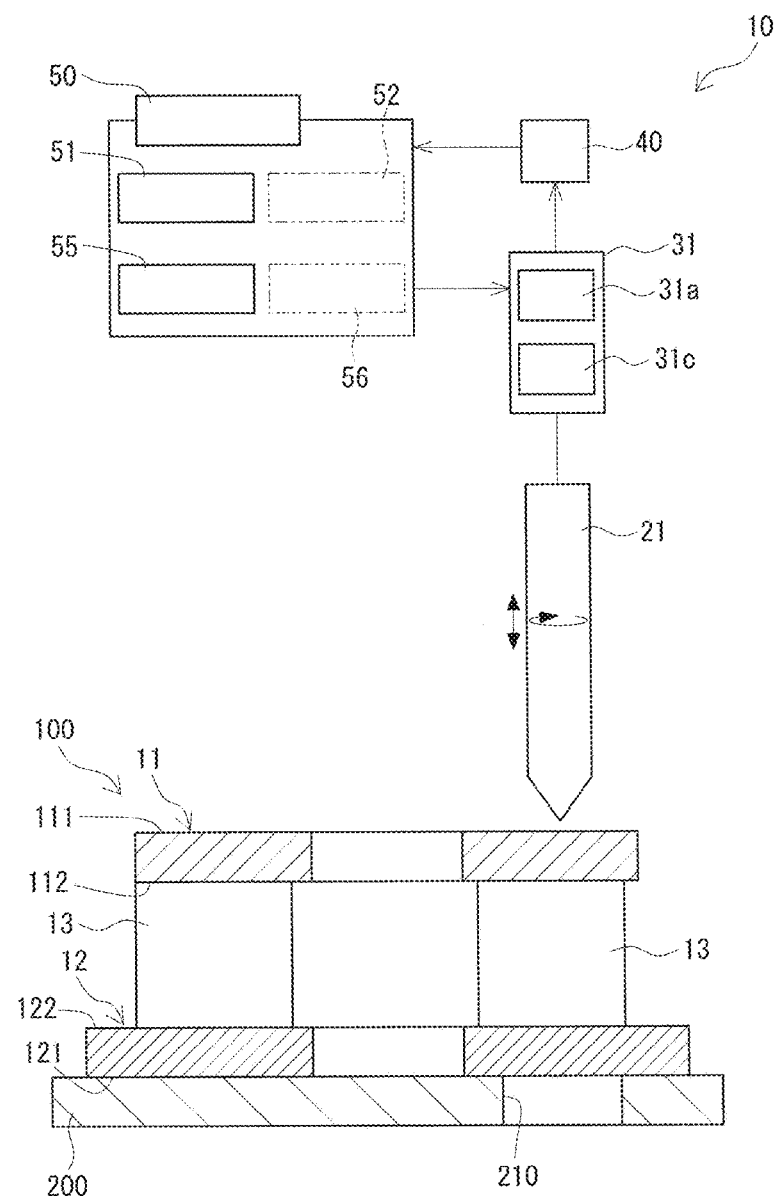
FIG. 5A is an explanatory view illustrating drilling in a processing system and the method for manufacturing the metal member of the first embodiment.

Workpiece 100 is a processed object that is processed by drilling tool 21 and chamfering tool 22. In the first embodiment, as illustrated in FIG. 5A, workpiece 100 includes first plate 11, second plate 12, and leg 13. Workpiece 100 corresponds to metal member 1 in which first plate 11 does not include first hole 113 and each first chamfered portion and second plate 12 does not include second hole 123 and each second chamfered portion. As described above, the same material and type as those of metal member 1 can be used as the material and type of workpiece 100.

Figure 6A:
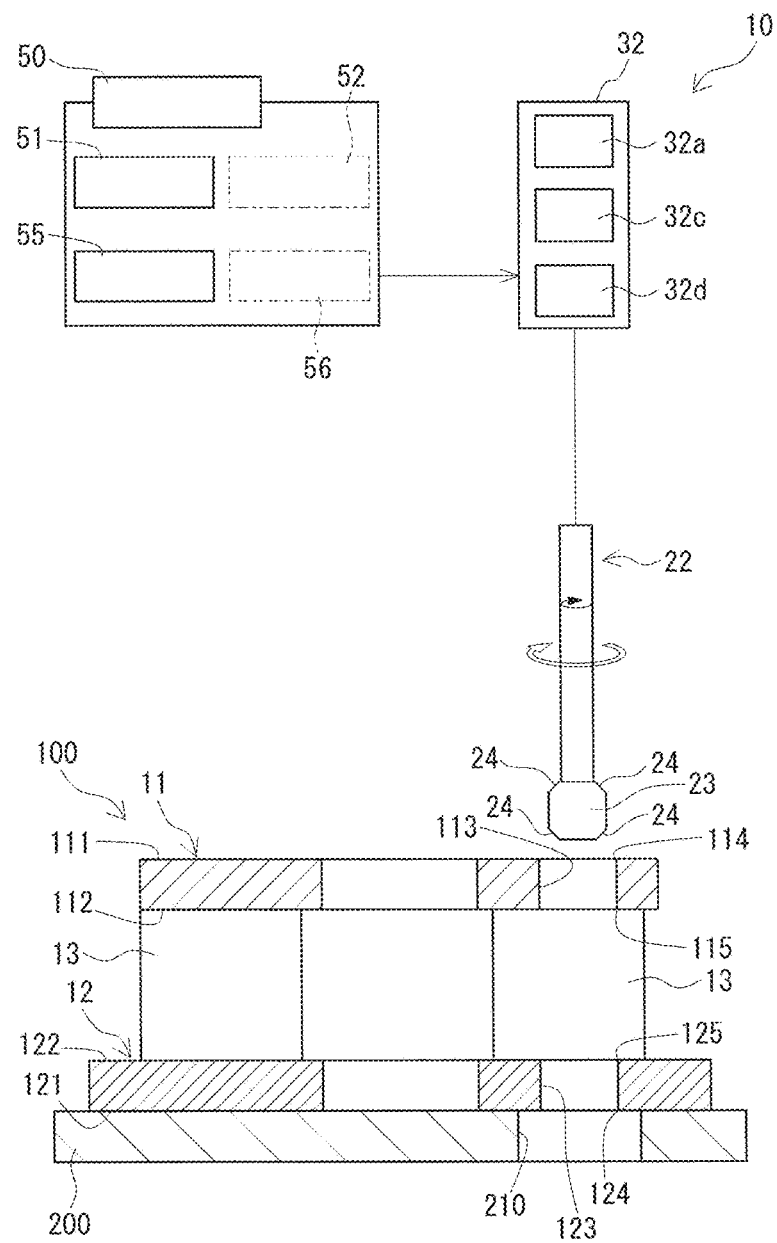
FIG. 6A is an explanatory view illustrating chamfering in the processing system and the method for manufacturing the metal member of the first embodiment.

Workpiece 100 is held on a table 200 when being processed. Table 200 preferably has a hole 210 serving as a clearance for drilling tool 21 and chamfering tool 22. Hole 210 is formed as a through-hole, but may be a blind hole. As illustrated in FIG. 6E, the inner diameter of hole 210 is set to such a diameter that chamfering tool 22 does not interfere with the inner circumferential surface of second hole 123 when chamfering tool 22 processes front-side second opening edge 124 of hole 210.

[Drilling Tool]

Figure 5B:
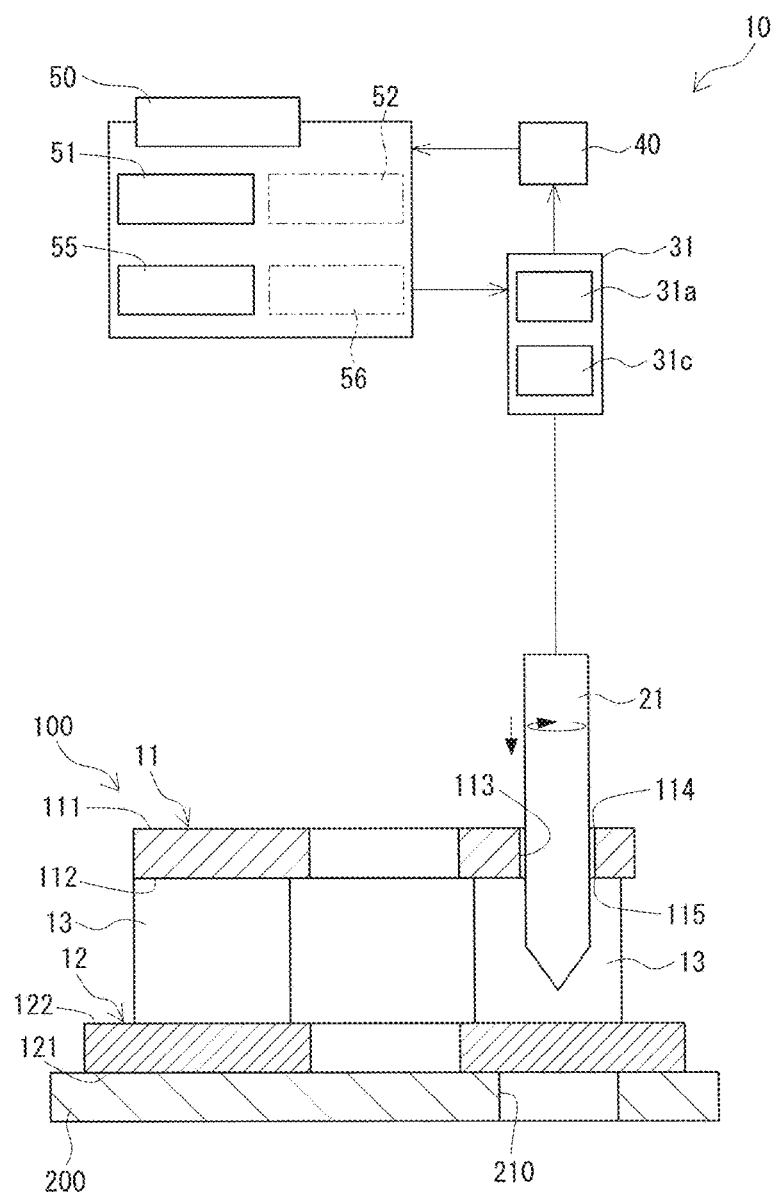
FIG. 5B is an explanatory view illustrating the drilling performed on a first plate in the processing system and the method for manufacturing the metal member of the first embodiment.
Figure 5C:
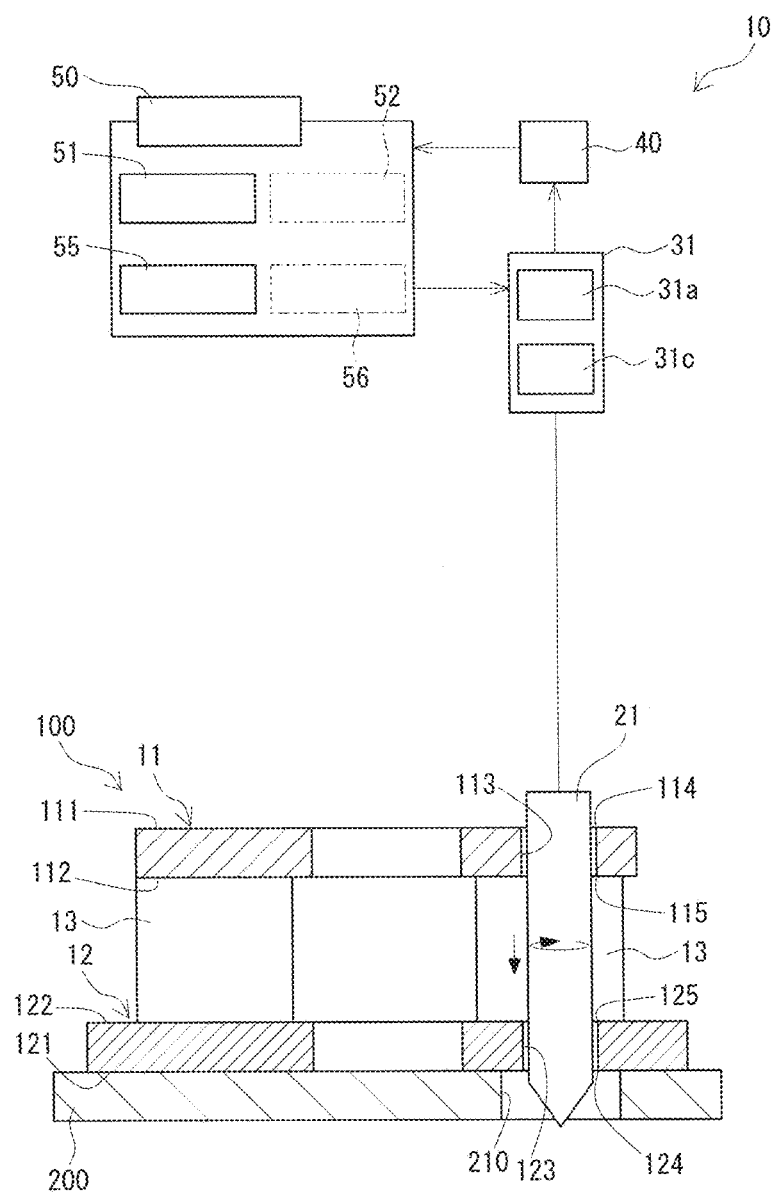
FIG. 5C is an explanatory view illustrating the drilling performed on a second plate in the processing system and the method for manufacturing the metal member of the first embodiment.

Drilling tool 21 makes first hole 113 in first plate 11 as illustrated in FIG. 5B, and makes second hole 123 in second plate 12 as illustrated in FIG. 5C. In the first embodiment, first hole 113 and second hole 123 are the same as first hole 113 and second hole 123 of metal member 1 described above with reference to FIG. 2. For example, a drill can be cited as an example of drilling tool 21.

[Chamfering Tool]

Figure 6B:
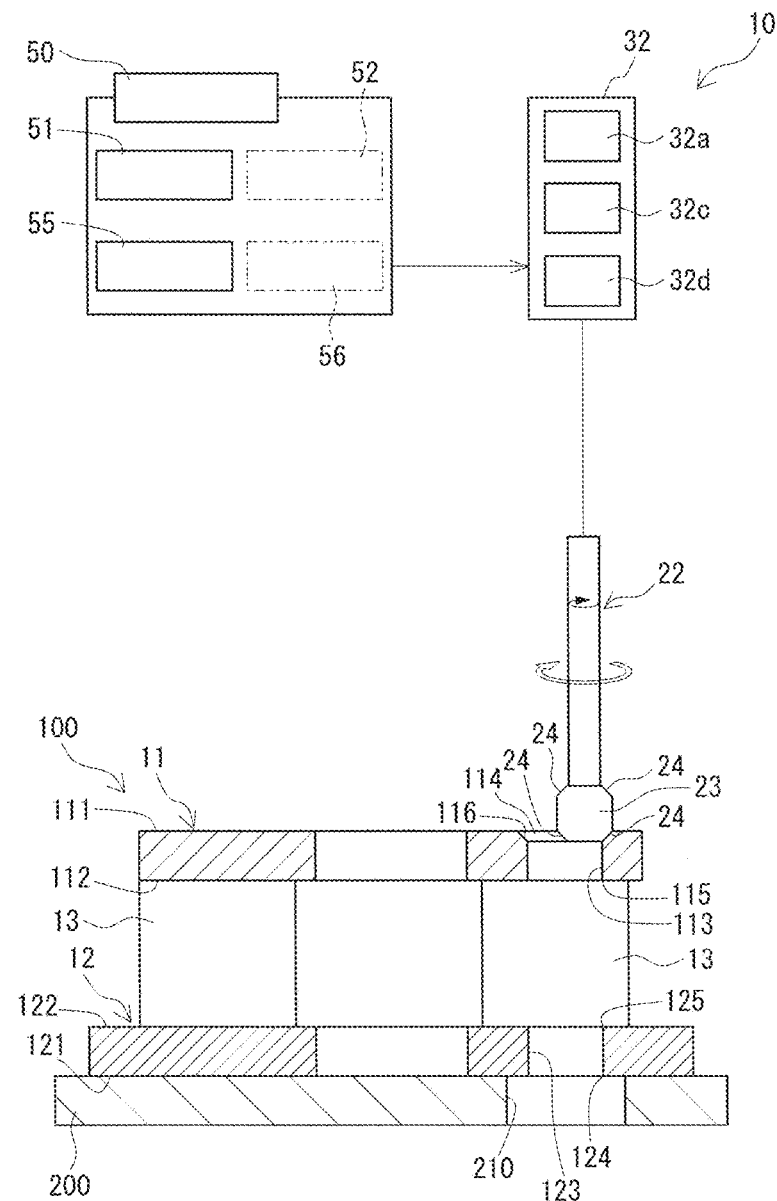
FIG. 6C is an explanatory view illustrating chamfering performed on the first hole in the processing system and the method for manufacturing the metal member of the first embodiment.
FIG. 6D is an explanatory view illustrating chamfering performed on a second hole in the processing system and the method for manufacturing the metal member of the first embodiment.
FIG. 6E is an explanatory view illustrating chamfering performed on the second hole in the processing system and the method for manufacturing a metal member of the first embodiment.
Figure 6C:
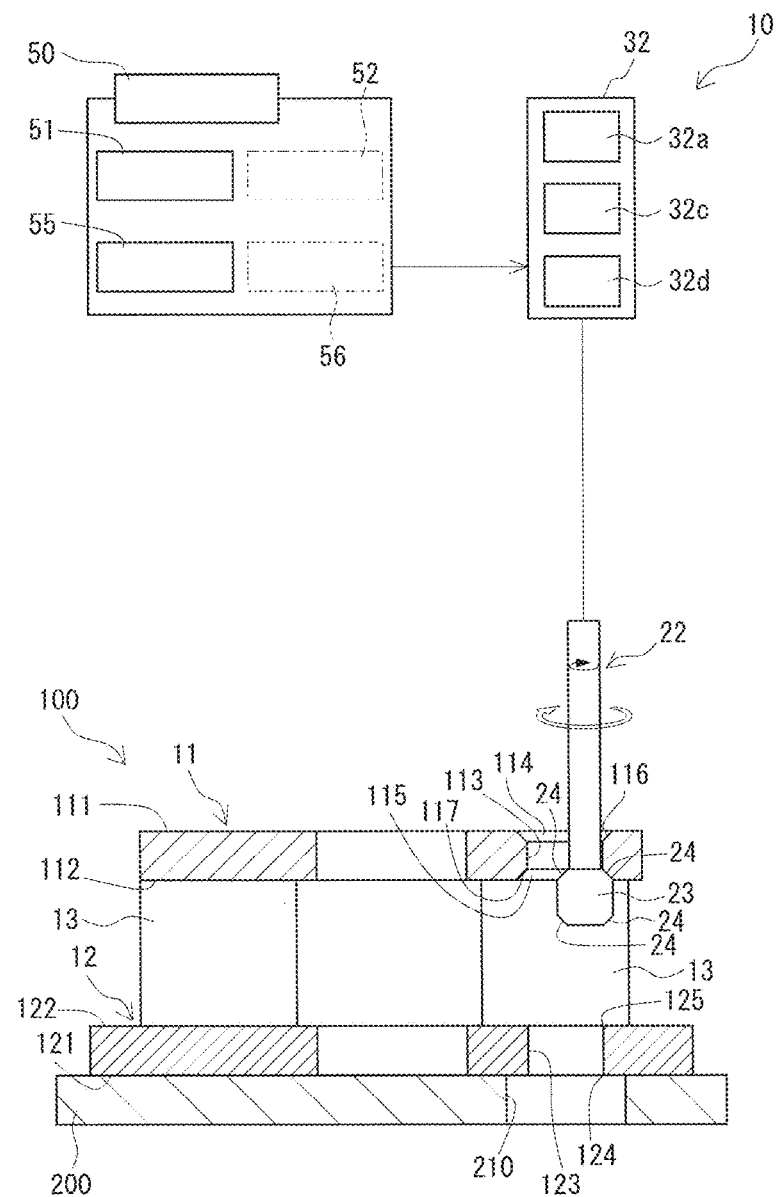
Figure 6D:
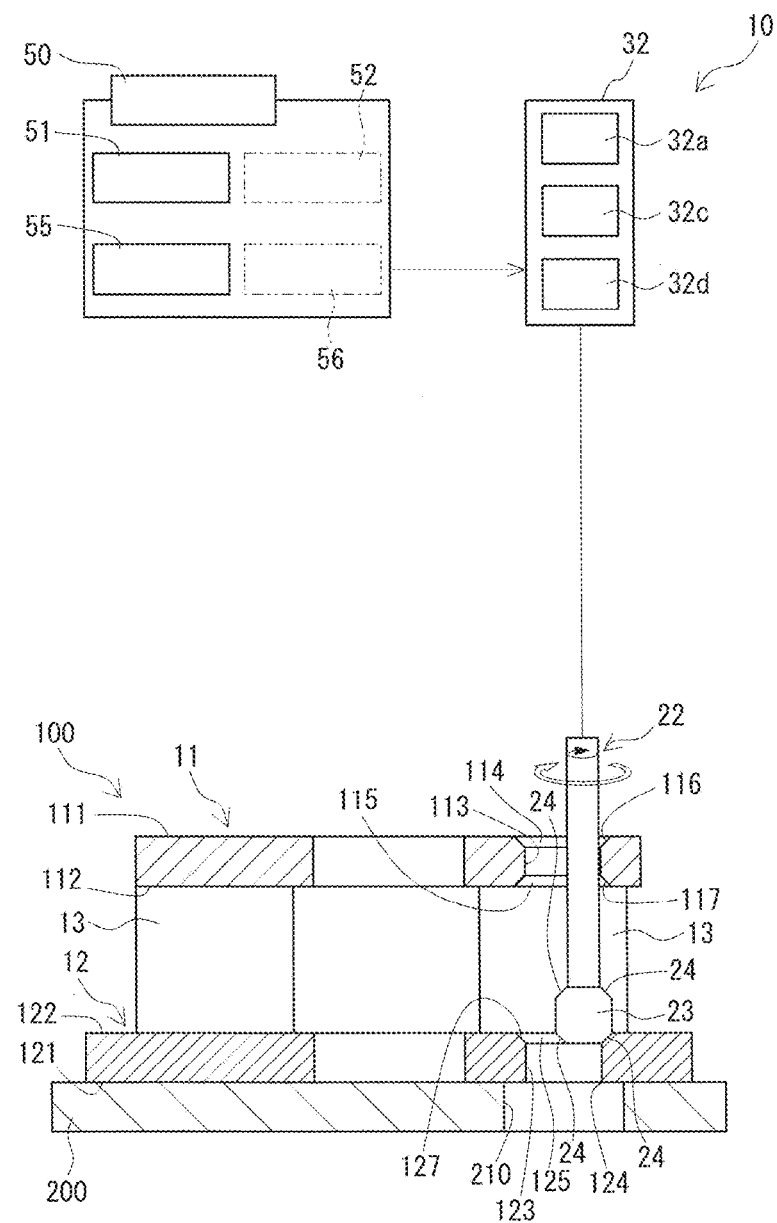
Figure 6E:
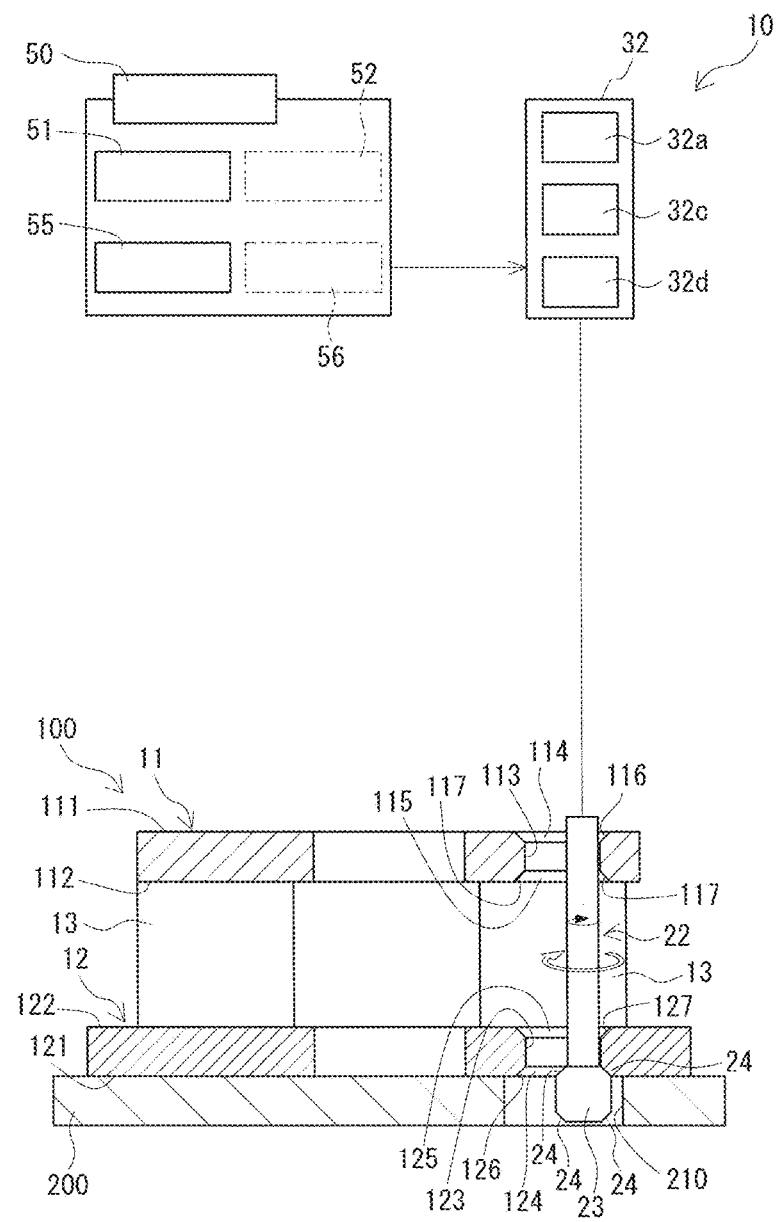

In first plate 11, chamfering tool 22 forms at least one of front-side first chamfered portion 116 provided in front-side first opening edge 114 as illustrated in FIG. 6B and back-side first chamfered portion 117 provided in back-side first opening edge 115 as illustrated in FIG. 6C. As illustrated in FIG. 6D, chamfering tool 22 forms back-side second chamfered portion 127 in at least back-side second opening edge 125 in second plate 12. Chamfering tool 22 may form both first chamfered portion 116 and back-side first chamfered portion 117 in first plate 11. As illustrated in FIG. 6E, chamfering tool 22 may further form front-side second chamfered portion 126 in front-side second opening edge 124 of second plate 12. The first chamfered portions and the second chamfered portions are formed by cutting. Each of the first chamfered portions and each of the second chamfered portions are the same as each of the first chamfered portions and each of the second chamfered portions of metal member 1 described above with reference to FIG. 2 or 3. For example, a chamfering cutter can be used as chamfering tool 22.

In the first embodiment, chamfering tool 22 includes a body 23 having an outer diameter smaller than an outer diameter of drilling tool 21 as illustrated in FIG. 6A. That is, the outer diameter of body 23 is smaller than the inner diameters of first hole 113 and second hole 123. The distal end of body 23 includes a cutting edge 24 tapered toward a distal end side. A rear end of body 23 includes a cutting edge 24 tapered toward a rear end side. Hereinafter, sometimes cutting edge 24 at the distal end of body 23 is simply referred to as cutting edge 24 on the distal end side, and cutting edge 24 at the rear end of body 23 is simply referred to as cutting edge 24 on the rear end side. Each cutting edge 24 has a shape corresponding to the shape of the first chamfered portion and the second chamfered portion described with reference to FIG. 2 or 3. A linear cutting edge or a twisted blade inclined with respect to the axis of body 23 can be exemplified in the case of the chamfering tool for chamfering, and an arcuate cutting edge can be exemplified in the case of the chamfering tool for R-chamfering. A plurality of cutting edges 24 are provided in the circumferential direction at the front end and the rear end of body 23.

Cutting edge 24 on the distal end side of chamfering tool 22 can process the opening edge located on a backward direction side of chamfering tool 22 in the hole of workpiece 100. That is, cutting edge 24 on the distal end side can cut front-side first opening edge 114 as illustrated in FIG. 6B and back-side second opening edge 125 as illustrated in FIG. 6D. Cutting edge 24 on the rear end side of chamfering tool 22 can process the opening edge located on an advancing direction side of chamfering tool 22 in the hole of workpiece 100. That is, cutting edge 24 on the rear end side can cut back-side first opening edge 115 as illustrated in FIG. 6C and front-side second opening edge 124 as illustrated in FIG. 6E. Chamfering tool 22 can continuously perform chamfering on both the first opening edges and both the second opening edges. Accordingly, processing system 10 is excellent in productivity of metal member 1. In chamfering tool 22, as long as a facing interval between first plate 11 and second plate 12 is in a range larger than the length along the axial direction of body 23, even when the facing interval is small, back-side first chamfered portion 117 can be formed by cutting back-side first opening edge 115, and back-side second chamfered portion 127 can be formed by cutting back-side second opening edge 125.

[First Drive Mechanism]

As illustrated in FIGS. 5A to 5C, first drive mechanism 31 operates drilling tool 21, and causes drilling tool 21 to perform an operation required for performing the predetermined drilling on first plate 11 and second plate 12 of workpiece 100. Examples of the predetermined drilling include the drilling of continuously performing first plate 11 and second plate 12 in this order by one drilling tool 21. Through the drilling, first hole 113 is made in first plate 11 as illustrated in FIG. 5B, and second hole 123 coaxial with first hole 113 is made in second plate 12 as illustrated in FIG. 5C. The required operations include moving drilling tool 21 in the axial direction of drilling tool 21 and rotating drilling tool 21.

First drive mechanism 31 includes a power source and a transmission mechanism that transmits power of the power source to drilling tool 21. The power source is a member that applies the power for drilling tool 21 to perform the operation required for processing. For example, a motor can be cited as an example of the rotation power source of drilling tool 21. A known transmission mechanism can be used as the transmission mechanism. For example, an XYZ-table, and a ball screw can be used as the first drive mechanism 31. The XYZ-table allows drilling tool 21 to move to an arbitrary position on a three-dimensional coordinate. A Z-direction is a lifting direction of drilling tool 21. An XY-direction is a direction orthogonal to the lifting direction of drilling tool 21. First drive mechanism 31 only needs to be able to raise and lower at least drilling tool 21, and is preferably able to move in a direction orthogonal to a raising and lowering direction. First drive mechanism 31 includes a feeding power source 31a and a rotation power source 31c. Feeding power source 31a is a Z-direction power source.

In first drive mechanism 31, feeding power source 31a causes drilling tool 21 is moved in the axial direction of drilling tool 21 to advance so as to approach workpiece 100 or to retreat so as to be moved away from workpiece 100. Arrows along the axial direction of drilling tool 21 in FIGS. 5A to 5C indicate an advancing direction and a retreating direction of drilling tool 21. Examples of the type of feeding power source 31a include a motor, a cylinder, and a solenoid. In first drive mechanism 31, drilling tool 21 is rotated by rotation power source 31c. An arrow along the circumferential direction of drilling tool 21 in FIGS. 5A to 5C indicates the rotation direction of drilling tool 21.

[Second Drive Mechanism]

As illustrated in FIGS. 6A to 6E, second drive mechanism 32 operates chamfering tool 22, and causes chamfering tool 22 to perform the operation required for performing predetermined chamfering on the opening edges of the plurality of holes of workpiece 100 by cutting. Examples of the predetermined chamfering processing include chamfering processing performed on front-side first opening edge 114 as illustrated in FIG. 6B and chamfering processing performed on back-side first opening edge 115 as illustrated in FIG. 6C with respect to first plate 11. As illustrated in FIG. 6D, chamfering performed on at least back-side second opening edge 125 with respect to second plate 12 can be cited as an example of the predetermined chamfering. By this chamfering, at least one of front-side first chamfered portion 116 in FIG. 6B and back-side first chamfered portion 117 in FIG. 6C is formed on first plate 11. In addition, by this chamfering, back-side second chamfered portion 127 in FIG. 6D is formed on second plate 12. The required operations include moving chamfering tool 22 in the axial direction of chamfering tool 22, rotating chamfering tool 22, and revolving chamfering tool 22 along the circumference of the opening edge of the hole.

Second drive mechanism 32 includes a power source and a transmission mechanism that transmits the power of the power source to chamfering tool 22. The power source is a member that applies the power for chamfering tool 22 to perform the operation required for processing. For example, a motor as described above can be cited as the rotation power source of chamfering tool 22. A known transmission mechanism can be used as the transmission mechanism. For example, similarly to first drive mechanism 31, the XYZ-table, and the ball screw can be used as second drive mechanism 32. The Z-direction is the lifting direction of chamfering tool 22. The XY-direction is the direction orthogonal to the lifting direction of chamfering tool 22. Second drive mechanism 32 includes a feeding power source 32a, a rotation power source 32c, and a revolution power source 32d. Feeding power source 32a is the Z-direction power source. Revolution power source 32d includes an X-direction power source and a V-direction power source.

In second drive mechanism 32, feeding power source 32a causes chamfering tool 22 is moved in the axial direction of chamfering tool 22 to advance so as to approach workpiece 100 or to retreat so as to be moved away from workpiece 100. Arrows along the axial direction of chamfering tool 22 in FIGS. 6A to 6E indicate an advancing direction and a retreating direction of chamfering tool 22. Examples of the type of feeding power source 32a include a motor, a cylinder, and a solenoid similarly to the type of feeding power source 31a described above.

In second drive mechanism 32, chamfering tool 22 is rotated by rotation power source 32c. In second drive mechanism 32, chamfering tool 22 is revolved by revolution power source 32d. Cutting edge 24 of chamfering tool 22 is brought into contact with the opening edge or separated from the opening edge by revolution power source 32d. In FIGS. 6A to 6E, an arrow along the circumferential direction of chamfering tool 22 indicates the rotation direction of chamfering tool 22, and a white arrow along the circumferential direction of chamfering tool 22 indicates the revolution direction of chamfering tool 22. The rotation direction and the revolution direction of chamfering tool 22 may be the same direction or opposite directions.

The type of rotation power source 32c and the type of revolution power source 32d in this example are both motors.

Second drive mechanism 32 may be provided separately from first drive mechanism 31, or at least a part of second drive mechanism 32 may be shared with first drive mechanism 31. For example, feeding power source 32a and rotation power source 32c of second drive mechanism 32 may be shared with feeding power source 31a and rotation power source 32c of first drive mechanism 31. Second drive mechanism 32 may be independent of first drive mechanism 31.

[Measurement Unit]

As illustrated in FIGS. 5A to 5C, measurement unit 40 acquires the first physical quantity and the second physical quantity related to the control of first drive mechanism 31. For example, preferably the first physical quantity acquired by measurement unit 40 is the feed speed of drilling tool 21. The second physical quantity acquired by measurement unit 40 is preferably a first time in FIG. 7. FIG. 7 is a graph illustrating a transition of a load current in rotation power source 31c of drilling tool 21 acquired by measurement unit 40. Details of the graph in FIG. 7 will be described later. The first time refers to a time from a start of the drilling of first plate 11 to a start of the drilling of second plate 12. The first time has a first processing time and an intermediate time. The first processing time refers to a time from the start of the drilling of first plate 11 to completion of the drilling of first plate 11. The intermediate time refers to a time from the completion of the drilling of first plate 11 to the start of the drilling of second plate 12. The reason why the feed speed and the first time are preferable is that it is easy to accurately calculate the positions of front-side first opening edge 114 and back-side first opening edge 115 in first hole 113 and the position of back-side second opening edge 125 in second hole 123 by a first arithmetic unit 51 of controller 50 described later.

Measurement unit 40 preferably further acquires a third physical quantity related to the control of first drive mechanism 31. The third physical quantity is preferably the second time in FIG. 7. The second time refers to a second processing time from the start of the drilling of second plate 12 to the completion of the drilling of second plate 12. The reason why the second time is preferable is that it is easy to accurately calculate the position of front-side second opening edge 124 in the second hole 123 by first arithmetic unit 51 of controller 50 described later.

The feed speed of drilling tool 21 can be obtained from a setting value of feeding power source 31a. For example, the first time and the second time can be acquired from the transition of the load current in rotation power source 31c. This is because the load current is correlated with processing resistance of drilling tool 21. The load current of rotation power source 31c can be measured by a current sensor.

During the drilling, the processing resistance of drilling tool 21, namely, the cutting resistance increases, so that load torque of rotation power source 31c increases, and the load current increases. The state during the drilling refers to the state in which drilling tool 21 and workpiece 100 are in contact with each other in the state in which drilling tool 21 is rotated by rotation power source 31c under the cutting condition at the time of drilling workpiece 100. The time between the period from the start to the completion of the drilling of the first plate 11 and the period from the start to the completion of the drilling of the second plate 12 can be cited as the state during the drilling.

On the other hand, because there is substantially no processing resistance of drilling tool 21 during idling of rotation power source 31c, the load torque of rotation power source 31c decreases, and the load current decreases. Accordingly, the load current takes a substantially constant value. Examples of the idling of rotation power source 31c include a period until the start of the drilling of first plate 11, a period until the completion of the drilling of first plate 11 and the start of the drilling of second plate 12, and a period until the completion of the drilling of second plate 12 and the retreat movement of drilling tool 21 to the initial position.

That is, as illustrated in FIG. 7, the time required from the first rise to the second rise through the fall of the load current is the first time. The time required from the first rise to the first fall of the load current in the first time is the first processing time. The time required from the first fall to the second rise of the load current in the first time is the intermediate time. The time required from the second rise to the second fall of the load current is the second processing time.

[Controller]

Controller 50 controls first drive mechanism 31 to cause drilling tool 21 to perform the above-described predetermined drilling, and controls second drive mechanism 32 to cause chamfering tool 22 to perform the above-described predetermined chamfering. Controller 50 changes the feed amount of chamfering tool 22 by feeding power source 32a as a control condition of second drive mechanism 32. The feed amount is changed based on the result of first arithmetic unit 51. Controller 50 is typically constituted by a computer. The computer includes a processor, and a memory. The memory stores a program causing the processor to execute a control procedure described later. The processor reads and executes the program stored in the memory. The program includes a program code related to a processing of changing the feed amount based on an arithmetic result of first arithmetic unit 51. As illustrated in FIGS. 5A to 5C and 6A to 6E, controller 50 includes first arithmetic unit 51 and a first storage unit 55.

(First Arithmetic Unit)

First arithmetic unit 51 calculates at least one of the position of front-side first opening edge 114 and the position of back-side first opening edge 115 and the position of back-side second opening edge 125 based on the first physical quantity and the second physical quantity acquired by measurement unit 40. The position of front-side first opening edge 114 and the position of back-side first opening edge 115 are determined by the length along the axial direction of first hole 113. The length of the first hole 113 along the axial direction is obtained based on, for example, the feed speed of the drilling tool 21 and the first processing time. The position of back-side second opening edge 125 is determined by the facing interval between first hole 113 and second hole 123. For example, the opposing interval is obtained based on the feed speed of drilling tool 21 and the intermediate time.

First arithmetic unit 51 can further calculate the position of front-side second opening edge 124 of second plate 12 by the third physical quantity acquired by measurement unit 40. The position of front-side second opening edge 124 is determined by the length along the axial direction of second hole 123. For example, the length of second hole 123 along the axial direction can be calculated based on the feed speed of drilling tool 21 and the second processing time. The position of each opening edge is stored in first storage unit 55.

[Control Procedure]

With reference to FIG. 7, a control procedure by controller 50 will be described. FIG. 7 is a graph illustrating the transition of the load current in rotation power source 31c of drilling tool 21. A horizontal axis in FIG. 7 represents time. A vertical axis in FIG. 7 represents a current value. FIG. [6] 7 illustrates the transition of the current value when workpiece 100 is processed using normal drilling tool 21 in which a defect is not generated. A waveform of the current value in FIG. 7 is illustrated in a simplified manner for convenience of description, but does not necessarily correspond to the actual waveform. In the first embodiment, the control procedure of chamfering will be described in the order of front-side first opening edge 114, back-side first opening edge 115 through first hole 113, back-side second opening edge 125, and front-side second opening edge 124 through second hole 123.

Measurement unit 40 previously acquires the feed speed of drilling tool 21 as the first physical quantity from the setting value of feeding power source 31a of drilling tool 21. In addition, measurement unit 40 acquires the first processing time and the intermediate time as the second physical quantity and the second processing time as the third physical quantity in a course of the drilling by drilling tool 21. The first processing time is time required from the start to the completion of the drilling of first plate 11. The intermediate time is time required from the completion of the drilling of first plate 11 to the start of the drilling of the second plate 12. The second processing time is time required from the start to the completion of the drilling of second plate 12. The first processing time, the intermediate time, and the second processing time can be grasped from the transition of the load current value of rotation power source 31c.

When drilling tool 21 is rotated by rotation power source 31c, measurement unit 40 acquires the current value of rotation power source 31c. As illustrated in FIGS. 5A to 5C, drilling tool 21 is advanced by the drive of feeding power source 31a, and performs the drilling from the side of first plate 11 to first plate 11 and second plate 12 in this order. Through the drilling, first hole 113 is formed in first plate 11 as illustrated in FIG. 5B, and second hole 123 is formed in second plate 12 as illustrated in FIG. 5C. When second hole 123 is formed, drilling tool 21 is retracted by the drive of feeding power source 31a and returns to the initial position.

The load current of drilling tool 21 changes during the course of the advance and retraction of drilling tool 21. Because the processing resistance of drilling tool 21 increases from the start to the completion of the drilling of first plate 11 in FIG. 5B, the current value increases as illustrated in FIG. 7. Because there is substantially no processing resistance of drilling tool 21 between the completion of the drilling of first plate 11 and the start of the drilling of second plate 12, the current value decreases as illustrated in FIG. 7. Specifically, the current value converges to the current value before the start of the drilling. Because the processing resistance of drilling tool 21 increases from the start to the completion of the drilling of second plate 12 in FIG. 5C, the current value increases as illustrated in FIG. 7. Because there is substantially no processing resistance between the completion of the drilling processing of second plate 12 and the return to the initial position, the current value decreases. Specifically, the current value converges to the current value before the start of the drilling. Measurement unit 40 can acquire the first processing time, the intermediate time, and the second processing time based on the change in the current value.

First arithmetic unit 51 calculates the positions of front-side first opening edge 114, back-side first opening edge 115, front-side second opening edge 124, and back-side second opening edge 125 based on the feed speed of drilling tool 21, the first processing time, the intermediate time, and the second processing time acquired by measurement unit 40. The method for obtaining the positions of front-side first opening edge 114, back-side first opening edge 115, front-side second opening edge 124, and back-side second opening edge 125 is as described above.

Controller 50 controls second drive mechanism 32 so as to process the opening edges in the order of front-side first opening edge 114, back-side first opening edge 115, back-side second opening edge 125, and front-side second opening edge 124 based on the positions of the opening edges.

Controller 50 drives rotation power source 32c. The timing of driving rotation power source 32c may be before cutting edge 24 comes into contact with the opening edge. That is, the timing of driving rotation power source 32c may be before driving feeding power source 32a described later, or after driving feeding power source 32a and before driving revolution power source 32d described later.

As illustrated in FIG. 6A, controller 50 drives feeding power source 32a such that chamfering tool 22 located at the initial position advances. In the first embodiment, when the position along the axial direction of cutting edge 24 on the distal end side of chamfering tool 22 advances to the same position as front-side first opening edge 114, controller 50 stops the drive of feeding power source 32a. By this stop, cutting edge 24 on the distal end side is maintained at the position where front-side first opening edge 114 can be processed.

When the driving of feeding power source 32a is stopped, as illustrated in FIG. 6B, controller 50 drives revolution power source 32d such that cutting edge 24 on the distal end side comes into contact with front-side first opening edge 114, and the entire circumference of front-side first opening edge 114 is cut to form front-side first chamfered portion 116. When the cutting is completed, controller 50 drives revolution power source 32d so as to separate cutting edge 24 on the distal end side from front-side first opening edge 114. When chamfering tool 22 moves in the direction orthogonal to the axial direction to the position where body 23 of chamfering tool 22 does not contact the inner circumferential surface of first hole 113 even when chamfering tool 22 is advanced, controller 50 stops the drive of revolution power source 32d.

When the drive of revolution power source 32d stops, controller 50 drives feeding power source 32a so as to advance chamfering tool 22. When chamfering tool 22 is inserted into first hole 113 and when the position of cutting edge 24 on the rear end side of chamfering tool 22 advances to the same position as back-side first opening edge 115, controller 50 stops the drive of feeding power source 32a. By this stop, cutting edge 24 on the rear end side is maintained at the position where back-side first opening edge 11S can be processed.

When feeding power source 32a stops, controller 50 sequentially drives revolution power source 32d and stops the drive of revolution power source 32d as described above. In this course, as illustrated in FIG. 6C, back-side first opening edge 115 is cut by chamfering tool 22 to form back-side first chamfered portion 117.

Controller 50 drives feeding power source 32a so as to advance chamfering tool 22. When the position of cutting edge 24 on the distal end side of chamfering tool 22 advances to the same position as back-side second opening edge 125, controller 50 stops the drive of feeding power source 32a. By this stop, cutting edge 24 on the distal end side is maintained at the position where back-side second opening edge 125 can be processed.

When feeding power source 32a stops, controller 50 sequentially drives revolution power source 32d and stops the drive of revolution power source 32d as described above. In this course, as illustrated in FIG. 6D, back-side second opening edge 125 is cut by chamfering tool 22 to form back-side second chamfered portion 127.

Controller 50 drives feeding power source 32*a* so as to advance chamfering tool 22. When the position of cutting edge 24 on the rear end side of chamfering tool 22 advances to the same position as front-side second opening edge 124, controller 50 stops the drive of feeding power source 32*a*. By this stop, cutting edge 24 on the rear end side is maintained at the position where front-side second opening edge 124 can be processed.

When feeding power source 32*a* stops, controller 50 sequentially drives revolution power source 32*d* and stops the drive of revolution power source 32*d* as described above. In this course, as illustrated in FIG. 6E, front-side second opening edge 124 is cut by chamfering tool 22 to form front-side second chamfered portion 126.

Controller 50 drives feeding power source 32*a* so as to retract chamfering tool 22. When chamfering tool 22 is retracted to the initial position, controller 50 stops the drive of feeding power source 32*a*.

As in the first embodiment, when metal member 1 including the plurality of first holes 113 and the plurality of second holes 123 on the circumference is manufactured, the above course is repeatedly performed. In the case of repeating the above course, after going through the above course and before going through the next process, drilling tool 21 is moved by a predetermined distance in the direction orthogonal to the axial direction of drilling tool 21, or workpiece 100 is rotated by a predetermined angle.

When rotation power source 31*c* and rotation power source 32*c* are shared, drilling tool 21 and chamfering tool 22 are replaced after the completion of drilling and before the chamfering. When being independent from each other, rotation power source 31*c* and rotation power source 32*c* may remain driven when the next processing of the workpiece exists, or may be temporarily stopped before the start of the next processing of the workpiece and re-driven. When the next workpiece does not exist, rotation power source 31*c* and rotation power source 32*c* are stopped.

[Application]

The processing system 10 of the first embodiment can be suitably used for a processing system that manufactures various general structural components. The general structural components are as described above.

[Operation and Effect]

Processing system 10 of the first embodiment can accurately obtain the positions of front-side first opening edge 114 and back-side first opening edge 115 of first hole 113 and the positions of front-side second opening edge 124 and back-side second opening edge 125 of second hole 123 even when the positions of the opening edges vary due to the dimensional tolerance of workpiece 100. Processing system 10 of the first embodiment can control second drive mechanism 32 for each workpiece 100 such that chamfering tool 22 can appropriately chamfer front-side first opening edge 114 and back-side first opening edge 115 and front-side second opening edge 124 and back-side second opening edge 125. Consequently, processing system 10 of the first embodiment can manufacture metal member 1.

[Method for Manufacturing Metal Member]

The method for manufacturing the metal member of the first embodiment includes the following processes A to C.

In the process A, workpiece 100 is prepared.

In the process B, first drive mechanism 31 operates drilling tool 21 to perform drilling on workpiece 100.

In the process C, chamfering tool 22 is operated by second drive mechanism 32 to perform chamfering on the opening edge of the hole made by the drilling.

Details will be described below.

[Process A]

Workpiece 100 to be prepared is a workpiece that is processed by the drilling tool and the chamfering tool. Workpiece 100 is as described in the section of workpiece 100 of processing system 10, and includes first plate 11, second plate 12, and leg 13 as illustrated in FIG. 5A.

[Process B]

In the drilling, first hole 113 is made in first plate 11 as illustrated in FIG. 5B, and second hole 123 is made in second plate 12 as illustrated in FIG. 5C. As illustrated in FIGS. 5A to 5C, first plate 11 and second plate 12 are drilled in the order of first plate 11 and second plate 12 from the side of first plate 11 such that the axis of first plate 11 and the axis of second plate 12 becomes coaxial. The process B includes a process B1 and a process B2.

(Process B1)

In the process B1, measurement unit 40 measures the first physical quantity and the second physical quantity related to the control of first drive mechanism 31. As described above, the acquired first physical quantity is the feed speed of drilling tool 21, and the acquired second physical quantity is preferably the first time. In the process B1, it is preferable to further acquire the second time as the third physical quantity. The preferable reason is as described above.

(Process B2)

In the process B2, the position of the opening edge of the hole made by the drilling is calculated based on the first physical quantity and the second physical quantity. The position of the calculated opening edge includes at least the position of back-side first opening edge 115 of first plate 11 and the position of back-side second opening edge 125 of second plate 12. The method for obtaining the position of back-side first opening edge 115 and the position of back-side second opening edge 125 is as described above. In the process B2, the position of front-side first opening edge 114 in first plate 11 is preferably calculated based on the first physical quantity and the second physical quantity, and the position of front-side second opening edge 124 in second plate 12 is preferably calculated based on the first physical quantity, the second physical quantity, and the third physical quantity.

[Process C]

In the chamfering, at least one of front-side first chamfered portion 116 provided in front-side first opening edge 114 as illustrated in FIG. 6B and back-side first chamfered portion 117 provided in back-side first opening edge 115 as illustrated in FIG. 6C is formed in first plate 11. In the chamfering, in second plate 12, back-side second chamfered portion 127 is formed on at least back-side second opening edge 125 as illustrated in FIG. 6D. In the chamfering, front-side second chamfered portion 126 may be formed on front-side second opening edge 124 as illustrated in FIG. 6E. The chamfering is performed by cutting using chamfering tool 22. The chamfered portion can not only improve a guiding property of the insertion object but also remove the burr formed when drilling tool 21 makes the hole, and the insertion object can be reliably inserted into the hole.

When front-side first opening edge 114 is chamfered, chamfering tool 22 is brought closer to front-side first opening edge 114 from the side of first front surface 111 as illustrated in FIG. 6B. When back-side first opening edge 115 is chamfered, as illustrated in FIG. 6C, chamfering tool 22 is inserted into first hole 113 from front-side first opening edge 115 and brought close to back-side first opening edge 115. When back-side second opening edge 125 is chamfered, as illustrated in FIG. 6D, chamfering tool 22 is inserted into first hole 113 and brought close to back-side second opening edge 125. When front-side second opening edge 124 is chamfered, as illustrated in FIG. 6E, chamfering tool 22 is inserted through first hole 113 and second hole 123 in this order and brought close to front-side second opening edge 124.

The order of the chamfering may be the order of front-side first opening edge 114, back-side first opening edge 115, back-side second opening edge 125, and front-side second opening edge 124, or the reverse order. The cutting is performed by changing the control condition of second drive mechanism 32 according to the position of back-side first opening edge 115 and the position of back-side second opening edge 125. The control condition of second drive mechanism 32 is changed as described above.

In the chamfering performed on back-side first opening edge 115 and back-side second opening edge 125, the chamfered lengths of back-side first chamfered portion 117 and back-side second chamfered portion 127 are preferably made smaller than the dimensional tolerance of the facing interval between first plate 11 and second plate 12. The chamfered length is as described above. The dimensional tolerance conforms to "tolerance" of "JIS Z 8103 (2019) measurement term".

When the chamfered length is smaller than the dimensional tolerance, chamfering tool 22 is not appropriately brought into contact with back-side first opening edge 115 of first plate 11 and back-side second opening edge 125 of second plate 12, and sometimes the appropriate chamfering cannot be performed. However, in the method for manufacturing the metal member of the first embodiment, the positions of back-side first opening edge 115 of first plate 11 and back-side second opening edge 125 of second plate 12 are calculated, and second drive mechanism 32 is controlled corresponding to the respective positions. Accordingly, even when the chamfered length is smaller than the dimensional tolerance, chamfering tool 22 is appropriately brought into contact with the opening edge, and the appropriate chamfering can be performed.

[Application]

The method for manufacturing the metal member of the first embodiment can be suitably used for a method for manufacturing various general structural components.

The general structural components are as described above.

[Operation and Effect]

In the method for manufacturing the metal member of the first embodiment, even when the positions of the opening edges vary due to dimensional tolerance of workpiece 100, the positions of front-side first opening edge 114 and back-side first opening edge 115 of first hole 113 and the positions of front-side second opening edge 124 and back-side second opening edge 125 of second hole 123 can be accurately obtained. In the method for manufacturing the metal member of the first embodiment, second drive mechanism 32 can be controlled for each workpiece 100 such that chamfering tool 22 can appropriately cut front-side first opening edge 114 and back-side first opening edge 115 and front-side second opening edge 124 and back-side second opening edge 125 in accordance with the positions of front-side first opening edge 114 and back-side first opening edge 115 and the positions of front-side second opening edge 124 and back-side second opening edge 125. Consequently, the method for manufacturing the metal member of the first embodiment can manufacture metal member 1.

Second Embodiment

[Processing System]

With reference to FIGS. 5A to 5C, 8, and 9, processing system 10 according to a second embodiment will be described. Processing system 10 of the second embodiment is different from processing system 10 of the first embodiment in the following requirement (1).

(1) Controller 50 changes the revolving speed of rotation power source 31c based on a difference between a first electric quantity and a second electric quantity acquired by measurement unit 40. Details of the first electric quantity and the second electric quantity will be described later.

The following description will focus on differences from the processing system 10 of the first embodiment. The description of the same configuration as the processing system 10 of the first embodiment will be omitted,

[Measurement Unit]

The first electric quantity is an electric quantity of rotation power source 31c acquired by measurement unit 40 during idling of rotation power source 31c. The second electric quantity is an electric quantity of rotation power source 31c acquired by measurement unit 40 during processing of workpiece 100. The processing of workpiece 100 includes processing of drilling first plate 11 of workpiece 100 and processing of drilling second plate 12 of workpiece 100. That is, the second electric quantity refers to the electric quantity of rotation power source 31c acquired by measurement unit 40 during the drilling of first plate 11 of workpiece 100. Alternatively, the second electric quantity refers to the electric quantity of rotation power source 31c acquired by measurement unit 40 during the drilling of second plate 12 of workpiece 100.

For example, the electric quantity of rotation power source 31c acquired by measurement unit 40 includes a value itself acquired by the current sensor, a value correlated with the value acquired by the current sensor, and a value obtained by performing a predetermined calculation on the value acquired by the current sensor. That is, the first electric quantity and the second electric quantity include the electric quantity itself for driving rotation power source 31c, a physical amount correlated with the electric quantity, or an arithmetic value calculated from the electric quantity. For example, at least one of magnitude of the load current of rotation power source 31c, a differential value, and an integral value is preferable as the first electric quantity and the second electric quantity. This is because the magnitude of the load current of rotation power source 31c, the differential value, and the integral value are correlated with the defect of drilling tool 21, so that the defect of drilling tool 21 is easy detect. The defect includes breakage of drilling tool 21 in addition to chipping of a blade of drilling tool 21. For example, the magnitude of the load current of rotation power source 31c is a value itself acquired by the current sensor. For example, a differential value and an integral value of the load current of rotation power source 31c are obtained by calculating the load current value of rotation power source 31c acquired by the current sensor. This calculation can be performed by controller 50 described later.

When the defect is generated in drilling tool 21, a region of drilling tool 21 that is not in contact with workpiece 100 increases, and thus the drilling itself becomes difficult. When the drilling is difficult, the processing resistance of drilling tool 21 decreases. When the processing resistance of drilling tool 21 is small, the load torque of rotation power source 31c decreases, so that the magnitude of the load current of rotation power source 31c decreases during the drilling of workpiece 100. That is, when the defect is generated in drilling tool 21, the magnitude of the load current of rotation power source 31c decreases.

Specifically, when drilling tool 21 is broken and does not come into contact with workpiece 100, the processing depth is zero (0). Because the processing depth is zero, the magnitude, the differential value, and the integral value of the load current of rotation power source 31c during the drilling of workpiece 100 are substantially similar to the magnitude, the differential value, and the integral value of the load current during the idling of rotation power source 31c. On the other hand, when drilling tool 21 comes into contact with workpiece 100 although the blade of drilling tool 21 is missing, the processing depth decreases. Because the processing depth is small, the magnitude, the differential value, and the integral value of the load current of rotation power source 31c during processing of workpiece 100 are small although not as large as when drilling tool 21 does not come into contact with workpiece 100. That is, the magnitude, the differential value, and the integral value of the load current of rotation power source 31c during processing of workpiece 100 approach the magnitude, the differential value, and the integral value of the load current during idling of rotation power source 31e. Consequently, at least one of the magnitude, the differential value, and the integral value of the load current of rotation power source 31c can be used to grasp whether drilling tool 21 processes workpiece 100, namely, whether the defect is generated in drilling tool 21.

[Controller]

Controller 50 controls rotation power source 31c. For example, controller 50 drives rotation power source 31c or stops rotation power source 31c. Controller 50 changes the control condition of rotation power source 31c. The control condition of rotation power source 31c is typically changed based on a first difference and a second difference described later. Controller 50 is typically constituted by a computer. The computer includes a processor, and a memory. The memory stores a program causing the processor to execute a control procedure described later. The processor reads and executes the program stored in the memory. The program includes a program code related to processing of determining whether the arithmetic result of second arithmetic unit 52 satisfies a threshold or less and processing of changing the revolving speed of rotation power source 31c based on the determination. Controller 50 includes second arithmetic unit 52 and second storage unit 56.

(Second Arithmetic Unit)

Second arithmetic unit 52 calculates the difference between the first electric quantity and the second electric quantity. The second electric quantity includes an electric quantity acquired by measurement unit 40 during the drilling of first plate 11 of workpiece 100 and an electric quantity acquired by measurement unit 40 during the drilling of second plate 12 of workpiece 100. That is, second arithmetic unit 52 calculates a first difference between the first electric quantity and the second electric quantity acquired by measurement unit 40 during the drilling of first plate 11 of workpiece 100 and a second difference between the first electric quantity and the second electric quantity acquired by measurement unit 40 during the drilling of second plate 12 of workpiece 100. As described above, when the first electric quantity and the second electric quantity are at least one of the magnitude, the differential value, and the integral value of the load current of rotation power source 31c, at least one of a difference between the magnitudes of the load current, a difference between the differential values, and a difference between the integral values can be cited as each of the calculated first difference and second difference. The first difference and the second difference are stored in second storage unit 56 included in controller 50.

When the first electric quantity is at least one of the magnitude, the differential value, and the integral value of a load current of rotation power source 31c, the first electric quantity takes a substantially constant value. The first electric quantity may be previously obtained and stored in second storage unit 56.

The first electric quantity may be acquired during idling of rotation power source 31c for each workpiece 100. When the first electric quantity is acquired for each workpiece 100 during idling of rotation power source 31c, for example, the first electric quantity may be as follows. As illustrated in FIG. 5A, at an initial position where drilling tool 21 is most retracted from workpiece 100, drilling tool 21 is rotated by rotation power source 31c under the same cutting condition as the cutting condition in actually processing workpiece 100. At this point, the electric quantity of rotation power source 31c acquired by measurement unit 40 can be cited.

The second electric quantity is as follows when the magnitude of the load current in rotation power source 31c is set. The first electric quantity is an average of the load currents acquired from the start to the completion of processing of first plate 11 by drilling tool 21. Alternatively, the second electric quantity is an average of the load currents acquired from the start to the completion of processing of second plate 12 by drilling tool 21.

In addition, when the second electric quantity is a differential value of the load current in rotation power source 31c, the second electric quantity is as follows. The second electric quantity is a differential value of the current value immediately after the start of processing of first plate 11 by drilling tool 21. Alternatively, the second electric quantity is a differential value of the current value immediately after the start of processing of second plate 12 by drilling tool 21. The time immediately after the start of processing is time from the start of processing until the maximum current value is reached.

Furthermore, when the second electric quantity is an integral value of the load current in rotation power source 31c, the second electric quantity is as follows. The second electric quantity is an integrated value of the load current acquired from the start to the completion of processing of first plate 11 by drilling tool 21. Alternatively, the second electric quantity is an integrated value of the load current acquired from the start to the completion of processing of second plate 12 by drilling tool 21.

For example, each processing start time and each processing completion time may be obtained by processing previously a plurality of workpieces using drilling tool 21 in which the defect is not generated, and may be stored in second storage unit 56. It is assumed that the material, shape, and size of the plurality of previously-processed workpiece and the material, shape, and size of workpiece 100 for main processing are the same. It is assumed that the processing conditions of the plurality of previously-processed workpiece and the processing conditions of workpiece 100 for main processing are the same. Each processing start time and each processing completion time can be grasped from the load current of rotation power source 31c. The number of the plurality of previously-processed workpieces may be about two to about ten The stored start of each processing may be set to the latest start of processing when each plate of the plurality of workpieces is processed. The stored time of completion of each processing may be the earliest time of completion of processing when each plate of the plurality of workpieces is processed. This makes it difficult for the average value and the integral value of the load current obtained from the start of processing to the completion of processing of each plate of the workpiece and the differential value of the load current immediately after the start of processing of each plate of the workpiece to include the current value during idling of rotation power source 31c. For this reason, the average value and the integral value of the load current obtained from the start of processing to the completion of processing of each plate of the workpiece and the differential value of the load current immediately after the start of processing of each plate of the workpiece correspond to the average value, the integral value, and the differential value of the load current when each plate is actually machined. Each stored processing start time may be updated each time the processing start time is delayed when each plate of workpiece 100 is processed. Similarly, when each stored processing is completed, each plate of workpiece 100 may be updated each time the processing is completed earlier.

Controller 50 sets the revolving speed of rotation power source 31c to zero when one of the case where the first difference is less than or equal to a first threshold and the case where second difference is less than or equal to a second threshold is satisfied. Examples of the first threshold and the second threshold include a safety factor of processing system 10 or a value based on whether the appropriate processing by drilling tool 21 is possible. The first threshold and the second threshold are previously stored in second storage unit 56. Sometimes the first threshold and the second threshold are the same.

When the revolving speed of rotation power source 31c becomes zero, the rotation of drilling tool 21 is stopped. The timing of changing the revolving speed of rotation power source 31c does not depend on the position of drilling tool 21. Feeding power source 31a may be driven to move drilling tool 21 to the initial position after the revolving speed of rotation power source 31c becomes zero, or the revolving speed of rotation power source 31c may be set to zero after feeding power source 31a is driven to move drilling tool 21 to the initial position. When either one is satisfied, drilling tool 21 has the defect. Accordingly, when controller 50 sets the revolving speed of rotation power source 31c to zero, a defective product that is not subjected to predetermined processing by drilling tool 21 can be prevented from being continuously produced.

When the first difference exceeds the first threshold and when the second difference exceeds the second threshold, controller 50 does not change the current revolving speed of rotation power source 31c of drilling tool 21. In this case, next workpiece 100 is subjected to the drilling by drilling tool 21 rotated at the same revolving speed of rotation power source 31c as that of workpiece 100 immediately before workpiece 100.

[Control Procedure]

Figure 8:
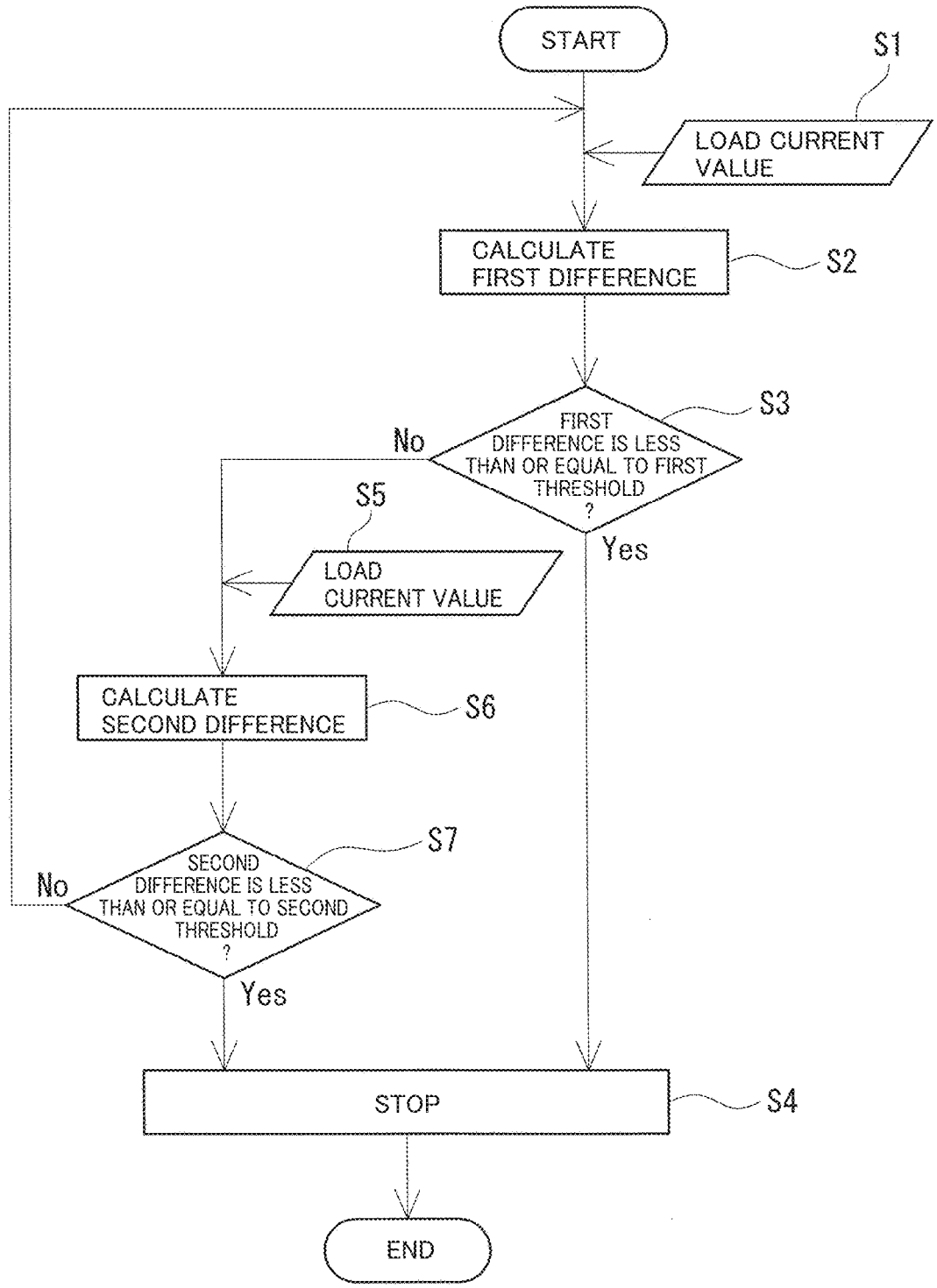
FIG. 8 is a flowchart illustrating a control procedure of a processing system according to a second embodiment.

With reference to FIG. 8, the control procedure by controller 50 will be described. When drilling tool 21 is rotated by rotation power source 31c, measurement unit 40 acquires the load current of rotation power source 31c at step S1 in FIG. 8.

Second arithmetic unit 52 calculates the first difference as step S2 in FIG. 8.

Controller 50 determines whether the first difference satisfies the first threshold or less as step S3 in FIG. 8. At this point, for convenience of description, when normal drilling tool 21 is used, the first threshold is set to an intermediate value of a difference between the second electric quantity during processing of first plate 11 and the first electric quantity during idling of rotation power source 31c. The intermediate value is at least one of an intermediate value of the difference between the magnitudes of the load currents, an intermediate value of the difference between the differential values, and an intermediate value of the difference between the integral values.

When step S3 satisfies the first threshold or less, in step S4, controller 50 sets the revolving speed of rotation power source 31c to zero. When the revolving speed of rotation power source 31c becomes zero, the rotation of drilling tool 21 is stopped. Then, the processing is ended. As described in detail later, examples of the case where step S3 satisfies the threshold or less include the case where the drilling tool in which the defect preventing the contact with workpiece 100 is generated is used, and the case where the drilling tool in which the defect is generated but can contact with workpiece 100 is used.

When the determination in step S3 is negative, measurement unit 40 acquires the load current of rotation power source 31c in step S5 in FIG. 8.

Second arithmetic unit 52 calculates the second difference as step S6 in FIG. 8.

Controller 50 determines whether the second difference satisfies the second threshold or less as step S7 in FIG. 8. At this point, for convenience of description, when normal drilling tool 21 is used, the second threshold is set to the intermediate value of the difference between at least one of the magnitude, the differential value, and the integral value of the load current during the processing of second plate 12 of workpiece 100 and at least one of the magnitude, the differential value, and the integral value of the load current during the idling of rotation power source 31c. Similarly to the first threshold, the intermediate value is set to at least one of the intermediate value of the difference between the magnitudes of the load current, the intermediate value of the difference between the differential values, and the intermediate value of the difference between the integral values.

When step S7 satisfies the second threshold or less, controller 50 sets the revolving speed of rotation power source 31c to zero as in step S4 described above.

When the determination in step S7 is negative, controller 50 does not change the revolving speed of rotation power source 31c. That is, next workpiece 100 is processed at the same revolving speed of rotation power source 31c as immediately-before workpiece 100, and the processing of next workpiece 100 and steps S1 to S3 are repeated until it is determined in step S3 that the rotation speed is equal to or less than the threshold. The case where the determination in step S3 is negative includes the case where the normal drilling tool in which the defect is not generated is used as described later in detail.

Figure 9:
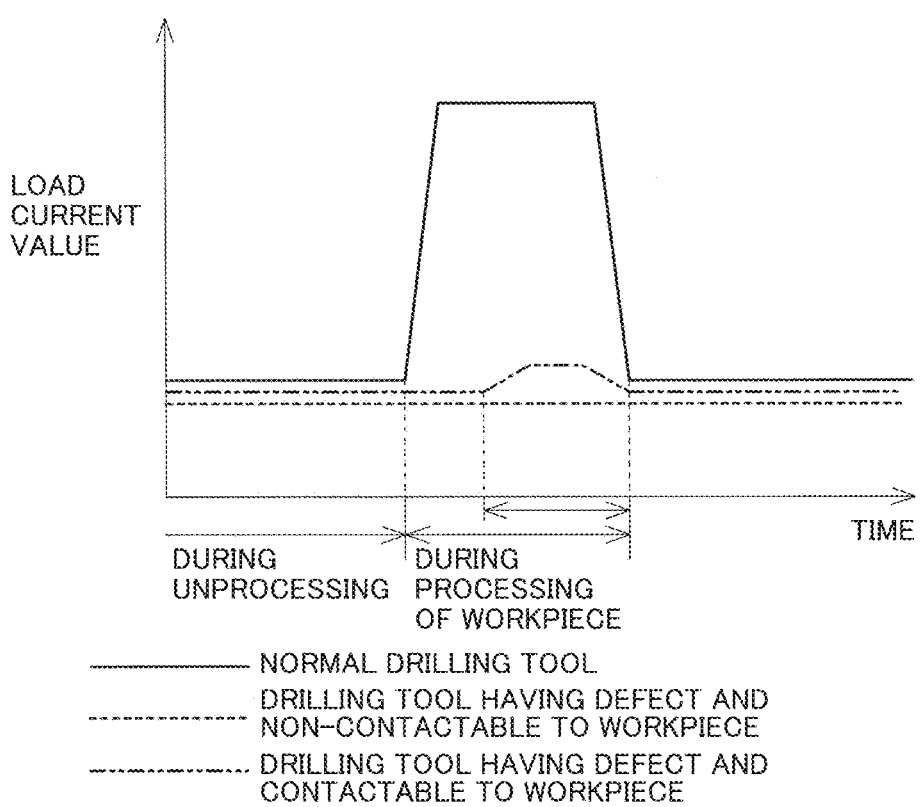
FIG. 9 is a graph illustrating a transition of a load current of a rotation power source that rotates a drilling tool acquired by a measurement unit included in the processing system of the second embodiment.

With reference to FIG. 9, the control procedure of controller 50 will be described in the case where each of the drilling tool in which the defect disabling the contact with workpiece 100 is generated, the drilling tool in which the defect is generated but can contact with workpiece 100, and the normal drilling tool in which the defect is not generated is used. FIG. 9 illustrates the transition of the load current of rotation power source 31c acquired by measurement unit 40 when workpiece 100 is processed using each tool described above. The horizontal axis in FIG. 9 represents time. The vertical axis in FIG. 9 represents the load current value. A broken line in FIG. 9 indicates the transition of the load current when the drilling tool in which the defect disabling the contact with workpiece 100 is generated is used. An alternate long and two short dashes line in FIG. 9 indicates the transition of the load current when the drilling tool capable of contacting with workpiece 100 is used although the defect is generated. A solid line in FIG. 9 indicates the transition of the load current when first plate 11 is processed using normal drilling tool 21 in which the defect is not generated.

Similarly to FIG. 7, the waveform of the load current in FIG. 9 is illustrated in a simplified manner for convenience of description, and does not necessarily correspond to the actual waveform.

(Case where Non-Contactable Drilling Tool is Used)

As indicated by the broken line in FIG. 9, the magnitude, the differential value, and the integral value of the load current during the drilling of first plate 11 of workpiece 100 are substantially similar to the magnitude, the differential value, and the integral value of the load current during the idling of rotation power source 31c. This is because the non-contactable drilling tool cannot reach workpiece 100, and thus the processing itself becomes difficult with respect to workpiece 100, so that the processing depth becomes zero. Second arithmetic unit 52 calculates the above-described first difference. The calculated first difference approaches substantially zero. Accordingly, when the first threshold is compared with the first difference, the first difference satisfies the first threshold or less. Based on the comparison result, controller 50 sets the revolving speed of rotation power source 31c to zero. When the revolving speed of rotation power source 31c becomes zero, the rotation of the drilling tool stops.

(Case where Contactable Drilling Tool Having Defect is Used)

As indicated by the alternate long and two short dashes line in FIG. 9, the processing start of first plate 11 of workpiece 100 is delayed as compared with the case of using normal drilling tool 21. The reason for this is that contactable drilling tool 21 having the defect reaches first plate 11, but it takes time to arrive. The magnitude, the differential value, and the integral value of the load current during the drilling of first plate 11 of workpiece 100 are all smaller than those in the case of using normal drilling tool 21. This is because the processing depth of the contactable drilling tool having the defect but can be brought into contact with first plate 11 is smaller than that of normal drilling tool 21. That is, the cutting resistance of the drilling tool during the drilling of first plate 11 is reduced. Second arithmetic unit 52 calculates the above-described first difference. The calculated first difference becomes small.

Accordingly, when the first threshold is compared with the first difference, the first difference satisfies the first threshold or less. Based on the comparison result, controller 50 sets the revolving speed of rotation power source 31c to zero.

(Case where Normal Drilling Tool 21 is Used)

As indicated by the solid line in FIG. 9, the magnitude, the differential value, and the integral value of the load current during the drilling of first plate 11 of workpiece 100 are larger than the magnitude, the differential value, and the integral value of the load current during the idling of rotation power source 31c. This is because normal drilling tool 21 has a larger contact region with workpiece 100, and thus the cutting resistance increases. Although not illustrated, the magnitude, the differential value, and the integral value of the load current during the drilling of second plate 12 of workpiece 100 have similar results. Second arithmetic unit 52 calculates the first difference and the second difference. The calculated first difference and second difference increase. Accordingly, when the first threshold and the first difference are compared, the first difference does not satisfy the first threshold or less. When the second threshold and the second difference are compared with each other, the second difference does not satisfy the second threshold or less. That is, the first difference exceeds the first threshold and the second difference exceeds the second threshold. Controller 50 does not change the revolving speed of rotation power source 31c based on the comparison result. Because the revolving speed of rotation power source 31c does not change, the rotation of drilling tool 21 is maintained.

For example, When drilling tool 21 is not broken during the drilling of first plate 11 and is broken at the start of the drilling of second plate 12, the load current is as follows although not illustrated. The load current during the drilling of first plate 11 has the waveform similar to the waveform indicated by the solid line in FIG. 9. The load current during the drilling of second plate 12 becomes the waveform similar to the waveform indicated by the broken line or the alternate long and two short dashes line in FIG. 9. In this case, the first difference is not less than or equal to the first threshold but exceeds the first threshold, and the second difference is less than or equal to the second threshold. Accordingly, controller 50 stops the drive of rotation power source 31c.

[Operation and Effect]

Processing system 10 of the second embodiment can detect the defect of drilling tool 21, the manufacturing of the defective product not subjected to the predetermined processing can be prevented by drilling tool 21.

[Method for Manufacturing Metal Member Capable of Detecting Defect of Drilling Tool]

In the method for manufacturing the metal member of the second embodiment, the process B includes a process of changing the revolving speed of rotation power source 31c. The revolving speed of rotation power source 31c is changed based on the difference between the first electric quantity and the second electric quantity. The first electric quantity and the second electric quantity are electric quantities of rotation power source 31c of first drive mechanism 31 that operates drilling tool 21, and are acquired by measurement unit 40. Hereinafter, details of this process will be described.

[Process B]

The acquired first electric quantity and second electric quantity are as described above. The first difference and the second difference can be cited as the above-described difference. In the process B, the revolving speed of rotation power source 31c is changed based on the comparison between the first threshold and the first difference and the comparison between the second threshold and the second difference. The first threshold and the second threshold are as described above.

When any one of the first difference that is less than or equal to the first threshold and the second difference that is less than or equal to the second threshold is satisfied, the revolving speed of rotation power source 31c is set to zero. When the rotation of rotation power source 31c stops, the defected drilling tool is replaced with the new drilling tool. After replacement with the new drilling tool, the next processing of the workpiece is repeatedly performed until one of the first difference that is less than or equal to the first threshold and the second difference that is less than or equal to the second threshold is satisfied.

On the other hand, when the first difference exceeds the first threshold and when the second difference exceeds the second threshold, the revolving speed of rotation power source 31c is not changed. In this case, next workpiece 100 is drilled by the drilling tool having the same revolving speed as immediately-before workpiece 100. Then, the next processing of workpiece 100 is repeatedly performed until one of the first difference that is less than or equal to the first threshold and the second difference that is less than or equal to the second threshold is satisfied.

[Operation and Effect]

The method for manufacturing the metal member can detect the defect of drilling tool 21, so that the manufacturing of the defective product that is not subjected to the predetermined drilling processing by drilling tool 21 can be prevented. The method for manufacturing the metal member can improve the productivity of the metal member. This is because it is not necessary to temporarily move drilling tool 21 to a detector to check presence or absence of the defect of drilling tool 21, and this checking operation can be omitted The present invention is not limited to the example, but includes meanings equivalent to the claims and all changes within the scope.

REFERENCE SIGNS LIST

1: metal member
11: first plate
111: first front surface
112: first back surface
113: first hole
114; front-side first opening edge
115: back-side first opening edge
116: front-side first chamfered portion
117: back-side first chamfered portion
12: second plate
121: second front surface
122: second back surface
123: second hole
124: front-side second opening edge
125: back-side second opening edge
126: front-side second chamfered portion
127: back-side second chamfered portion
13: leg
15: cutting mark
10: processing system
21: drilling tool
22: chamfering tool
23: body
24: cutting edge
31: first drive mechanism
31a: feeding power source
31c: rotation power source
32: second drive mechanism
32a: feeding power source
32c: rotation power source
32d: revolution power source
40: measurement unit
50: controller
51: first arithmetic unit
52: second arithmetic unit
55: first storage unit
56: second storage unit
100: workpiece
200: table
210: hole

The invention claimed is:

1. A processing system comprising:
a drilling tool and a chamfering tool that process a workpiece made of a metal member;
a first drive mechanism that operates the drilling tool;
a second drive mechanism that operates the chamfering tool;
a controller that controls the first drive mechanism and the second drive mechanism; and
a measurement unit that acquires a first physical quantity and a second physical quantity related to the control of the first drive mechanism,
wherein the workpiece includes:
a first plate including a first front surface and a first back surface;
a second plate including a second front surface and a second back surface; and
a leg that fixes the first plate and the second plate such that the first back surface and the second back surface face each other at an interval,
wherein the controller is configured to control the first drive mechanism to operate the drilling tool so as to coaxially and sequentially process; (i) a first hole penetrating the first front surface and the first back surface, and (ii) a second hole provided in the second plate,
the first hole is a hole including: (a) a front-side first opening edge provided in the first front surface, and (b) a back-side first opening edge provided in the first back surface,
the second hole is a hole including a back-side second opening edge provided in at least the second back surface,
wherein the controller is configured to control the second drive mechanism to operate the chamfering tool so as to provide a first chamfered portion at a first opening edge of at least one of the front-side first opening edge and the back-side first opening edge, and to provide a back-side second chamfered portion at the back-side second opening edge,
wherein the first physical quantity is a feed speed of the drilling tool, and the second physical quantity is a first time from a start of drilling the first plate to a start of drilling the second plate, and
wherein the controller;
obtains: (ai) a position of the at least one first opening edge and (aii) a position of the back-side second opening edge, both the position of the at least one first opening edge and the position of the back-side second opening edge are obtained based on the first physical quantity and the second physical quantity, and
controls the second drive mechanism based on the position of the at least one first opening edge and the position of the back-side second opening edge.

2. The processing system according to claim 1, wherein the position of the at least one first opening edge and the position of the back-side second opening edge are obtained by a length along an axial direction of the first hole and a length between the first plate and the second plate, and
the length of the first hole along the axial direction and the length between the first plate and the second plate are obtained based on the feed speed and the first time.

3. The processing system according to claim 2, wherein the chamfering tool has a columnar body having an outer diameter smaller than an outer diameter of the drilling tool, a distal end of the body, distal relative to the second drive mechanism, includes a tapered cutting edge that is tapered toward a distal end side of the chamfering tool, and a rear end of the body, closer to the second drive mechanism than is the distal end of the body, has a tapered cutting edge that is tapered toward a rear end side of the chamfering tool.

4. The processing system according to claim 2, wherein the first drive mechanism includes a rotation power source rotating the drilling tool, the measurement unit acquires an electric quantity of the rotation power source, the controller changes a revolving speed of the rotation power source based on a difference between a first electric quantity and a second electric quantity, the first electric quantity is an electric quantity acquired by the measurement unit during rotation of the rotation power source and before processing of the workpiece, and the second electric quantity is an electric quantity acquired by the measurement unit during drilling of the workpiece.

5. The processing system according to claim 4, wherein the first electric quantity and the second electric quantity are at least one of magnitude of a load current of the rotation power source, a differential value of the load current of the rotation power source, and an integral value of the load current of the rotation power source.

6. The processing system according to claim 5, wherein the controller sets the revolving speed of the rotation power source to zero when the difference is less than or equal to a threshold.

7. The processing system according to claim 1, wherein the chamfering tool has a columnar body having an outer diameter smaller than an outer diameter of the drilling tool, a distal end of the body, distal relative to the second drive mechanism, includes a tapered cutting edge that is tapered toward a distal end side of the chamfering tool, and a rear end of the body, closer to the second drive mechanism than is the distal end of the body, has a tapered cutting edge that is tapered toward a rear end side of the chamfering tool.

8. The processing system according to claim 7, wherein the first drive mechanism includes a rotation power source rotating the drilling tool, the measurement unit acquires an electric quantity of the rotation power source, the controller changes a revolving speed of the rotation power source based on a difference between a first electric quantity and a second electric quantity, the first electric quantity is an electric quantity acquired by the measurement unit during rotation of the rotation power source and before processing of the workpiece, and the second electric quantity is an electric quantity acquired by the measurement unit during drilling of the workpiece.

9. The processing system according to claim 8, wherein the first electric quantity and the second electric quantity are at least one of magnitude of a load current of the rotation power source, a differential value of the load current of the rotation power source, and an integral value of the load current of the rotation power source.

10. The processing system according to claim 9, wherein the controller sets the revolving speed of the rotation power source to zero when the difference is less than or equal to a threshold.

11. The processing system according to claim 1, wherein the first drive mechanism includes a rotation power source rotating the drilling tool, the measurement unit acquires an electric quantity of the rotation power source, the controller changes a revolving speed of the rotation power source based on a difference between a first electric quantity and a second electric quantity, the first electric quantity is an electric quantity acquired by the measurement unit during rotation of the rotation power source and before processing of the workpiece, and the second electric quantity is an electric quantity acquired by the measurement unit during drilling of the workpiece.

12. The processing system according to claim 11, wherein the first electric quantity and the second electric quantity are at least one of magnitude of a load current of the rotation power source, a differential value of the load current of the rotation power source, and an integral value of the load current of the rotation power source.

13. The processing system according to claim 11, wherein the controller sets the revolving speed of the rotation power source to zero when the difference is less than or equal to a threshold.

14. A method, the method comprising:
providing the processing system according to claim 1;
preparing the workpiece made of the metal member;
drilling the workpiece using the drilling tool operated by the first drive mechanism;
chamfering the workpiece by cutting using the chamfering tool operated by the second drive mechanism;
acquiring the first physical quantity and the second physical quantity via the measurement unit; and
obtaining, based on the first physical quantity and the second physical quantity, the position of a first opening edge of: (ai) the at least one of the front-side first opening edge and the back-side first opening edge, and (aii) the position of the back-side second opening edge;
the drilling includes processing coaxially and sequentially: (i) the first hole penetrating the first front surface and the first back surface, and (ii) the second hole provided in the second plate, and
the chamfering includes:
providing the first chamfered portion in the at least one first opening edge and providing the back-side second chamfered portion in the back-side second opening edge, wherein the providing of the first chamfered portion and of the back-side second portion are based on the position of the at least one first opening edge and the position of the back-side second opening edge.

15. The method according to claim 14, wherein, to perform the chamfering, the second drive mechanism is operated such that a chamfered length of the chamfered portion is smaller than a dimensional tolerance of a length between the first plate and the second plate.

* * * * *

UNITED STATES PATENT AND TRADEMARK OFFICE
CERTIFICATE OF CORRECTION

| | | |
|---|---|---|
| PATENT NO. | : 12,202,089 B2 | Page 1 of 1 |
| APPLICATION NO. | : 17/642953 | |
| DATED | : January 21, 2025 | |
| INVENTOR(S) | : Kazuo Maeda | |

It is certified that error appears in the above-identified patent and that said Letters Patent is hereby corrected as shown below:

In the Specification

Column 22, Lines 64-65, "FIG. [6] 7 illustrates" should read -- FIG. 7 illustrates --.

Column 36, Line 20, "process;" should read -- process: --.

Column 36, Line 43, "the controller;" should read -- the controller: --.

Signed and Sealed this
Eighth Day of April, 2025

Coke Morgan Stewart
*Acting Director of the United States Patent and Trademark Office*